US011849030B2

(12) United States Patent
Chmora et al.

(10) Patent No.: US 11,849,030 B2
(45) Date of Patent: Dec. 19, 2023

(54) METHOD AND SYSTEM FOR ANONYMOUS IDENTIFICATION OF A USER

(71) Applicant: "ENKRI HOLDING", LIMITED LIABILITY COMPANY, Voronezh (RU)

(72) Inventors: Andrey Lvovich Chmora, Moscow (RU); Roman Anatolievich Nekrasov, Moscow (RU); Igor Sergeevich Bityutskikh, Voronezh (RU)

(73) Assignee: "ENKRI HOLDING", LIMITED LIABILITY COMPANY, Voronezh (RU)

( * ) Notice: Subject to any disclaimer, the term of this patent is extended or adjusted under 35 U.S.C. 154(b) by 379 days.

(21) Appl. No.: 17/295,570

(22) PCT Filed: Oct. 23, 2019

(86) PCT No.: PCT/RU2019/000765
§ 371 (c)(1),
(2) Date: May 20, 2021

(87) PCT Pub. No.: WO2021/080449
PCT Pub. Date: Apr. 29, 2021

(65) Prior Publication Data
US 2022/0294612 A1  Sep. 15, 2022

(51) Int. Cl.
*H04L 9/08* (2006.01)
*H04L 9/06* (2006.01)
(Continued)

(52) U.S. Cl.
CPC .......... *H04L 9/0833* (2013.01); *H04L 9/0643* (2013.01); *H04L 9/0825* (2013.01);
(Continued)

(58) Field of Classification Search
CPC . H04L 2209/42; H04L 9/0643; H04L 9/0825; H04L 9/0833; H04L 9/0869; H04L 9/3066; H04L 9/3073; H04L 9/321
See application file for complete search history.

(56) References Cited

U.S. PATENT DOCUMENTS

| 4,748,668 A | 5/1988 | Shamir et al. |
| 4,933,970 A | 6/1990 | Shamir |

(Continued)

OTHER PUBLICATIONS

Dodis, Yevgeniy et al.; "Anonymous Identification in Ad Hoc Groups"; Advances in Cryptology—Eurocrypt 2004; [Lecture Notes in Computer Science], Springer-Verlag, Berlin/Heidelberg, Germany, vol. 3027, Apr. 17, 2004, 18 pages (XP-019005043).

(Continued)

*Primary Examiner* — Gary S Gracia
(74) *Attorney, Agent, or Firm* — Muncy, Geissler, Olds & Lowe, P.C.

(57) ABSTRACT

The present invention relates, in general, to computing engineering and, more particularly, to a method and system for anonymously identifying a user as a member of a group of users. The authors provide the improved anonymous identification witness hiding protocol intended to verify membership in a local community of registered participants based on one-way accumulators developed using quasi-commutative one-way elliptic curve functions. The identification protocol according to the present invention provides the required level of cryptographic security with low operational efforts and resource consumption.

18 Claims, 4 Drawing Sheets

(51) Int. Cl.
*H04L 9/30* (2006.01)
*H04L 9/32* (2006.01)

(52) U.S. Cl.
CPC .......... *H04L 9/0869* (2013.01); *H04L 9/3073* (2013.01); *H04L 9/321* (2013.01)

(56) References Cited

U.S. PATENT DOCUMENTS

| | | | | |
|---|---|---|---|---|
| 8,078,876 | B2* | 12/2011 | Brickell | H04L 9/3255 713/168 |
| 8,356,181 | B2* | 1/2013 | Brickell | H04L 9/3218 713/180 |
| 8,799,656 | B2* | 8/2014 | Brickell | H04L 9/0844 380/282 |
| 10,762,197 | B1* | 9/2020 | Yu | H04L 9/50 |
| 2009/0129600 | A1* | 5/2009 | Brickell | H04L 9/3234 380/282 |
| 2013/0326602 | A1* | 12/2013 | Chen | G06F 21/64 726/6 |
| 2014/0040147 | A1* | 2/2014 | Varadarajan | G06Q 20/4016 713/168 |
| 2014/0095883 | A1* | 4/2014 | Kirillov | H04L 9/0891 713/176 |
| 2014/0173281 | A1* | 6/2014 | Hwang | H04L 9/3255 713/171 |
| 2015/0206088 | A1* | 7/2015 | Gouvernel | G06F 40/131 705/7.39 |
| 2016/0275461 | A1* | 9/2016 | Sprague | H04W 12/06 |
| 2017/0061463 | A1* | 3/2017 | Ettl | G06Q 30/0239 |
| 2017/0177449 | A1* | 6/2017 | Bronk | H04L 63/062 |
| 2017/0230182 | A1* | 8/2017 | Misoczki | H04L 9/3255 |
| 2018/0046823 | A1* | 2/2018 | Durham | H04L 9/3236 |
| 2019/0066169 | A1* | 2/2019 | Costello | H04N 7/181 |
| 2019/0164153 | A1* | 5/2019 | Agrawal | G06Q 20/383 |
| 2019/0306124 | A1* | 10/2019 | Bild | H04L 9/0833 |
| 2019/0319801 | A1* | 10/2019 | Sastry | H04L 9/3239 |
| 2020/0112442 | A1* | 4/2020 | Wentz | H04L 9/3297 |
| 2020/0153627 | A1* | 5/2020 | Wentz | G06F 21/6218 |
| 2020/0162268 | A1* | 5/2020 | Wentz | H04L 9/50 |
| 2020/0296128 | A1* | 9/2020 | Wentz | H04L 63/1433 |
| 2020/0349616 | A1* | 11/2020 | El Kaafarani | G06Q 30/0282 |
| 2020/0351657 | A1* | 11/2020 | Wentz | H04L 9/3268 |
| 2020/0356085 | A1* | 11/2020 | Wentz | H04L 9/0866 |
| 2021/0091952 | A1* | 3/2021 | Wentz | H04L 9/3218 |
| 2021/0135879 | A1* | 5/2021 | Heo | H04L 9/085 |
| 2021/0325855 | A1* | 10/2021 | Wouhaybi | G05B 19/41845 |
| 2022/0051314 | A1* | 2/2022 | Enkhtaivan | H04L 9/3239 |
| 2022/0103377 | A1* | 3/2022 | Traore | H04L 9/3255 |
| 2022/0158855 | A1* | 5/2022 | Wentz | H04L 9/3247 |

OTHER PUBLICATIONS

Nguyen, Lan; "Accumulators from Bilinear Pairings and Applications to ID-based Ring Signatures and Group Membership Revocation"; International Association for Cryptologic Research, vol. 033453, Nov. 8, 2006, 32 pages (XP-061001612).

Driscoll, John Oliver ; "GitHub—johnoliverdriscoll/ecc-acc at 4f92cccbcea39cfeb33368dde1529eeecf95ccb9", Oct. 2, 2019, Retrieved from the Internet: URL: https://github.com/johnoliverdriscoll/ecc-acc/tree/4f92cccbcea39cfeb33368dde1529eeecf95ccb9 [retrieved on May 19, 2021], 7 pages (XP-055716801).

* cited by examiner

METHOD AND SYSTEM FOR ANONYMOUS IDENTIFICATION OF A USER

FIELD OF THE INVENTION

The present invention relates, in general, to computing engineering and, more particularly, to a method and a system for anonymously identifying a user as a member of a group of users.

BACKGROUND OF THE INVENTION

The task of proving membership of an entity in a certain local community has been set and solved differently in the course of development of public relationships and technical means. Nowadays, in order to solve such tasks, various electronic identification solutions are mostly employed using suitable computing techniques of cryptography and electronic means. Electronic means are often organized in a distributed manner, in which case exchange of (encrypted) messages between them is involved when performing identification. For example, U.S. Pat. No. 4,748,668 describes implementation of user identification based on issuance, by a trusted center, of a smart card for each user belonging to a certain group of users in order to enable the user to subsequently authenticate himself or herself by using the issued smart card.

In view of the increasing urgency and complexity of the considered task, at the present stage identification protocols are being developed and improved for the purpose of providing required reliability and/or security of the identification, on the one hand, and increasing performance and efficiency of using resources involved thereby, on the other hand. In particular, U.S. Pat. No. 4,933,970 describes implementation of an identification protocol based on improvement of the well-known Fiat-Shamir Scheme.

In the above-mentioned context, constructive ideas described in article [1] where the terms "one-way quasi-commutative function" and "accumulator" were first introduced, have served as an impulse for creating a new identification protocol. Such an identification protocol has been provided in LAN NGUYEN: "Accumulators from Bilinear Pairings and Applications to ID-based RingSignatures and Group Membership Revocation", IACR, INTERNATIONAL ASSOCIATION FOR CRYPTOLOGIC RESEARCH, vol. 20061108:033453, 2006. However, rather high computational costs and amounts of communicated information in proof generation and verification are typical to the protocol according to this publication.

SUMMARY OF THE INVENTION

The object of the present invention is to create an anonymous identification witness hiding protocol intended to verify membership in a local community of registered participants based on one-way accumulators developed using quasi-commutative one-way elliptic curve functions. The key aspect of the present invention is that particularly the mechanism of elliptic curves is applied for developing the one-way accumulators. Transition from the group $\mathbb{Z}_n^* = \{a \in \mathbb{Z}_n | \gcd(a,n)=1\}$ and from the prime order subgroup of the group $\mathbb{F}_p^*$ to a similar subgroup of the group of elliptic curve points fully corresponds to the current trends in the applied cryptography.

According to the first aspect of the invention, a method of anonymously identifying a user as a member of a group of users is provided. The method is performed in a computing system comprising at least one computing device of a trusted party and a plurality of computing devices of users.

The method comprises (1) a preliminary stage including steps performed in the computing device of the trusted party, the steps comprising:

(1a): for each j-th user from n users of the group, $1 \leq j \leq n$, computing a unique private identifier $x_j$ for the j-th user, wherein $x_j$ does not enable to restore therefrom any personal information of the j-th user, and wherein each of the computed private identifiers has the same number of digits $\lambda$;

(1b): for each i-th user from n users of the group, $1 \leq i \leq n$, computing a personal secret for the i-th user as $P_i = [\beta \hat{\Gamma}_i \pmod{m}] G_1$, where $\hat{\Gamma}_i = x_i^{-1} \Gamma \pmod{m}$, $\Gamma = \Pi_{i=1}^n x_i \pmod{m}$, $\beta$ is a common secret available only to the trusted party, $G_1$ is a generator of a subgroup $\mathbb{G}_1$ of a prime order m of an additive group of points $E(\mathbb{F}_p)$ on an elliptic curve $E/\mathbb{F}_p$ over a finite field $\mathbb{F}_p$, p>3 is an odd prime, [·] denotes scalar product; and sending, to a computing device of the i-th user, the private identifier $x_i$ of the i-th user and the personal secret $P_i$ of the i-th user; and (1c): computing a public group key for the group as $\tilde{g} = e_m([\beta \Gamma \pmod{m}] G_1, G_1)$ where $e_m(\cdot, \cdot)$ is symmetric pairing which represents mapping $\mathbb{G}_1 \times \mathbb{G}_1 \mapsto \mathbb{G}_3$, wherein $\mathbb{G}_3$ is a subgroup of the prime order m of a multiplicative group of an extended finite field $\mathbb{F}_{p^k}^*$ with a generator g with an embedding degree k>1.

p, m, $\mathbb{G}_1$, $\mathbb{G}_3$, $e_m(\cdot, \cdot)$ are preset in the computing device of the trusted party and are publicly known, $\beta$ is preset in the computing device of the trusted party, wherein $\beta \in_R (0, m-1]$, $2^{\lambda-1} < m < 2^\lambda$, where n<m.

The method further comprises (2) an identification session including steps comprising:

(2a): in a computing device of a user to be identified, computing a witness as $P1 = [v]P$, where P is a personal secret of the user to be identified, v is a first random number selected in the computing device of the user to be identified, the first random number being usable only once (i.e. ephemeral) for each identification session, $v \in_R (0, m-1]$, and sending, from the computing device of the user to be identified to the computing device of a verifying party, a first message containing the computed witness;

(2b): in the computing device of the verifying party, computing a query as $P2 = [\phi] G_1$, where $\phi$ is a second random number selected in the computing device of the verifying party, the second random number being ephemeral for each identification session, $\phi \in_R (0, m-1]$, and sending, from the computing device of the verifying party to the computing device of the user to be identified, a second message containing the computed query;

(2c): in the computing device of the user to be identified, computing a response as $g_1 = e_m([v+z \pmod{m}]P, P2)$, where z is a private identifier of the user to be identified, and sending, from the computing device of the user to be identified to the computing device of the verifying party, a third message containing the computed response, (2d): in the computing device of the verifying party, verifying the response $g_1$ for equality to a verification factor computed as $\tilde{g}^\phi g_2$, where $g_2 = e_m(P1, P2)$ and identifying the user to be identified as a member of the group only if the response is equal to the computed verification factor.

Step (1a) of the preliminary stage (1) preferably further comprises, prior to said computing: for each j-th user from n users of the group, $1 \leq j \leq n$, assigning to the j-th user a registration identifier $a_j$, where $a_j$ is a sequence of symbols. The unique private identifier $x_j$ for the j-th user is preferably computed based on $a_j$, without possibility to restore $a_j$ from $x_j$. In particular, the private identifier $x_i$ for the i-th user, $1 \leq i \leq n$, is preferably computed as $x_i=h(a_i\|h^i(\beta))$, where $h(\cdot)$ is a $\lambda$-bit first cryptographic hash function, $h^i(\cdot)$ denotes i-time iterative application of $h(\cdot)$, $\cdot\|\cdot$ denotes concatenation.

Prior to computing the witness, step (2a) of the identification session (2) preferably comprises: verifying whether a condition $([v]P \neq \infty) \wedge ([v+z \pmod{m}]P \neq \infty)$ is met with respect to the selected v, and, if said condition is not met, selecting a new v.

Prior to computing the response $g_1$, step (2c) of the identification session (2) preferably comprises: ensuring that $P2 \neq \infty$, wherein if $P2=\infty$, the identification session (2) is terminated.

Preferably, computing the public group key for the group includes steps comprising:

creating a public group key certificate including information about the trusted party, the public group key, and a digital signature (DS) of the public group key certificate;

placing the public group key certificate into a public data storage.

Prior to verifying the response $g_1$ for equality to the verification factor, the method preferably further includes steps performed in the computing device of the verifying party, said steps comprising: reading the public group key certificate from the public data storage, and verifying the DS of said certificate, wherein said verification of the response $g_1$ is performed only if the DS of the public group key certificate is successfully verified.

The DS of the public group key certificate is preferably computed as $\mathfrak{S} \Leftarrow \mathrm{Sign}(\mathcal{H}(\tilde{g}\|\mathcal{D}_T), \mathcal{S})$, where $\mathrm{Sign}(\cdot, \cdot)$ is a function of generating the DS, $\mathcal{S}$ is a secret key of the trusted party, $\mathcal{D}_T$ is the information about the trusted party, $\mathcal{H}(\cdot)$ is a second cryptographic hash function. The DS of the public group key certificate is preferably verified with $\mathfrak{B} \rightarrow (\mathcal{H}(\tilde{g}\|\mathcal{D}_T), \mathfrak{S}, \mathcal{P})$, where $\mathrm{Verify}(\cdot,\cdot,\cdot)$ is a function of verifying the DS, wherein a value of $\mathfrak{B}$ is True if the DS is valid, and False otherwise, $\mathcal{P}$ is a public key of the trusted party, said public key being paired to $\mathcal{S}$, wherein said verification of the response $g_1$ is performed if $(\mathfrak{B}=\mathrm{True}) \wedge (P1 \neq \infty)$.

According to an embodiment, when at least one new user is added to the group, steps (1a) of the preliminary stage (1) are further performed with respect to said at least one new user, and steps (1b) to (1c) of the preliminary stage (1) are newly performed with respect to the entire group of users whereto the at least one new user has been added.

According to an embodiment, upon each exclusion of at least one user from the group of users, the preliminary stage (1) further comprises a step performed in the computing device of the trusted party, said step comprising: selecting a new common secret $\beta'$ such that $\beta'$ is not equal to a previously used common secret, wherein steps (1b) to (1c) of the preliminary stage (1) are newly performed with respect to the entire group of users from which said at least one user has been excluded.

According to the second aspect of the invention, a computing system configured for anonymously identifying a user as a member of a group of users is provided. The computing system comprises, at least, a computing device of a trusted party and a plurality of computing devices of users. The computing device of the trusted party and the computing devices of the users each comprise, at least: one or more processors; communication means; and one or more data storage devices having computer-executable instructions stored therein for execution by the one or more processors.

The computing device of the trusted party, when executing the instructions by the one or more processors of the computing device of the trusted party, is configured to perform a preliminary stage (1) comprising the following operations:

(1a): for each j-th user from n users of the group, $1 \leq j \leq n$, computing a unique private identifier $x_j$ for the j-th user, wherein $x_j$ does not enable to restore therefrom any personal information of the j-th user, and wherein each of the computed private identifiers has the same number of digits $\lambda$;

(1b): for each i-th user from n users of the group, $1 \leq i \leq n$, computing a personal secret for the i-th user as $P_i=[\beta \hat{\Gamma}_i \pmod{m}]G_1$, where $\hat{\Gamma}_i=x_i^{-1}\Gamma \pmod{m}$, $\Gamma=\Pi_{i=1}^n x_i \pmod{m}$, $\beta$ is a common secret available only to the trusted party, $G_1$ is a generator of a subgroup $\mathbb{G}_1$ of a prime order m of an additive group of points $E(\mathbb{F}_p)$ on an elliptic curve $E/\mathbb{F}_p$ over a finite field $\mathbb{F}_p$, $p>3$ is an odd prime, $[\cdot]$ denotes scalar product; and sending, to a computing device of the i-th user, the private identifier $x_i$ of the i-th user and the personal secret $P_i$ of the i-th user; and (1c): computing a public group key for the group as $\tilde{g}=e_m([\beta\Gamma \pmod m)]G_1, G_1)$, where $e_m(\cdot,\cdot)$ is symmetric pairing which represents mapping $\mathbb{G}_1 \times \mathbb{G}_1 \mapsto \mathbb{G}_3$, wherein $\mathbb{G}_3$ is a subgroup of the prime order m of a multiplicative group of an extended finite field $\mathbb{F}_{p^k}^*$ with a generator g with an embedding degree $k>1$.

P, m, $\mathbb{G}_1$, $\mathbb{G}_3$, $e_m(\cdot,\cdot)$ are preset in the computing device of the trusted party and are publicly known, $\beta$ is preset in the computing device of the trusted party, wherein $\beta \in_R (0, m-1]$, $2^{\lambda-1} < m < 2^\lambda$, where $n < m$.

A computing device of a verifying party, when executing the instructions by the one or more processors of the computing device of the verifying party, and a computing device of a user to be identified, when executing the instructions by the one or more processors of the computing device of the user to be identified, are configured to perform an identification session (2) comprising the following operations:

(2a): in the computing device of the user to be identified, computing a witness as $P1=[v]P$, where P is a personal secret of the user to be identified, v is a first random number selected in the computing device of the user to be identified, the first random number being ephemeral for each identification session, $v \in_R (0, m-1]$, and sending, from the computing device of the user to be identified to the computing device of the verifying party, a first message containing the computed witness;

(2b): in the computing device of the verifying party, computing a query as $P2=[\phi]G_1$, where $\phi$ is a second random number selected in the computing device of the verifying party, the second random number being ephemeral for each identification session, $\phi \in_R (0, m-1]$, and sending, from the computing device of the verifying party to the computing device of the user to be identified, a second message containing the computed query;

(2c): in the computing device of the user to be identified, computing a response as $g_1=e_m([v+z \pmod{m}]P, P2)$, where z is a private identifier of the user to be identified, and sending, from the computing device of the user to be identified to the computing device of the verifying party, a third message containing the computed response, (2d): in the computing device of the verifying party, verifying the response $g_1$ for equality to a verification factor computed as $\tilde{g}^\phi g_2$, where $g_2=e_m(P1, P2)$ and identifying the user to be identified as a member of the group only if the response is equal to the computed verification factor.

The identification protocol according to the present invention provides the required level of cryptographic security with low operational efforts and resource consumption. Thus, since verification complexity and the amount of public storage to store public information do not depend on the number of participants, the asymptotic estimate of verification complexity and reserved storage amount is O(1).

DETAILED DESCRIPTION OF THE INVENTION

Figure 1:
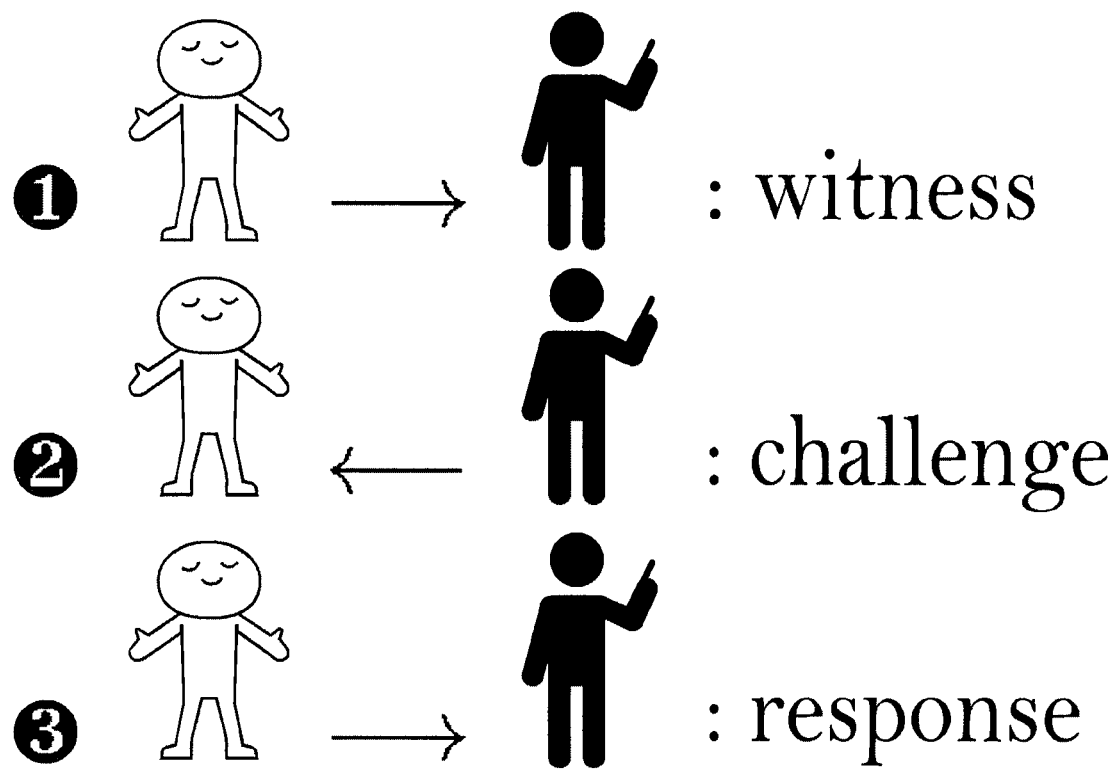
FIG. 1 is the schematic illustration of the message-exchange protocol in accordance with the present invention.

Reference is further made to exemplary embodiments of the present invention which are shown in the accompanying figures where identical reference numbers indicate similar parts. It should be appreciated that embodiments of the present invention may have different forms and are not intended to be limited by the descriptions presented herein. Consequently, the exemplary embodiments given below are described with reference to figures for explaining the essence of the aspects of the present invention.

1. INTRODUCTION

Section 2 below gives interpreted description of one-way quasi-commutative functions and accumulator. Sections 3 and 4 give an overview of some facts of the theory of elliptic curves and bilinear mappings for better understanding of Section 5 which discloses development of one-way elliptic curve accumulators, as proposed in the present application. Section 6 gives a short overview of identification protocols. Section 7 describes processes of developing and analyzing cryptographic security of the interactive identification witness hiding protocol in accordance with the present invention. It should be noted that this protocol is suitable for solving a number of practical tasks, including the one described in subsection 2.1.

$\log_2 x$ is hereinafter designated as $\lg x$.

2. ONE-WAY QUASI-COMMUTATIVE FUNCTIONS

In [1], such terms as "one-way quasi-commutative function" and "one-way accumulation function" also referred to as "one-way accumulator" were introduced.

Definition 2.1. Let $\Sigma=\{0,1\}$. $\Sigma^*$ denotes a set of all variable-length binary sequences.

Let a function $f: \Sigma^* \times \Sigma^* \mapsto \Sigma^*$ is given. The function is called a one-way function if:

The function $f(\cdot, \cdot)$ is surjective.

For all $x, y, \in \Sigma^*$, there is an algorithm $\mathcal{A}$ such that the time to compute $\tilde{x}=f(x,y)$ is limited by a certain polynomial function of the number of binary symbols at the input of $\mathcal{A}$.

For all $\tilde{x} \in \Sigma^*$, there is no knowledge of an algorithm $\mathcal{B}$ such that at a given $\tilde{x}$ the time to compute $f^{-1}(\tilde{x}) \to \{x,y\}$ is limited by a certain polynomial function of the number of binary symbols at the input of $\mathcal{B}$ and which allows to unambiguously identify the case $x, y \notin \text{Im}(f)$, where $\text{Im}(f)$ is the interval in which the function $f(\cdot, \cdot)$ is defined.

In [2], [3] it is shown that one-way hash functions exist if and only if one-way functions exist which, in their turn, exist if and only if digital signature (DS) schemes exist. In addition, in [4] it is proven that existence of one-way functions is equivalent to existence of cryptographic generators of pseudo-random numbers.

Definition 2.2. $\xi: Y^n \mapsto Y$ is a commutative function if $$\forall y_i \in Y, \xi(y_1, y_2, \ldots, y_n) = \xi(\pi(y_1, y_2, \ldots, y_n)),$$

where $\pi$ is a random permutation on the set $\{y_1, y_2, \ldots, y_n\}$, $n \geq 1$.

Definition 2.3. $f: X \times Y \mapsto X$ is a one-way quasi-commutative function if $$\forall y_i \in Y \; \forall x \in X, f(x, \xi(y_1, y_2, \ldots, y_n)) = f(x, \xi(\pi(y_1, y_2, \ldots, y_n))).$$

Let $\mathcal{Y} = \xi^*(y_1, y_2, \ldots, y_n)$. For given $x \in X$ and $\mathcal{Y}, \mathcal{Y}' \in Y$ the task of finding $x' \in X$ such that $f(x, \mathcal{Y}) = f(x', \mathcal{Y}')$ relates to the class of computationally hard problems. In other words, there is no known algorithm for which the time of finding the solution is limited by a polynomial function of $\lg x'$.

The term "quasi-commutative function" emphasizes the fact that in general $f(x, \mathcal{Y}) \neq f(\mathcal{Y}, x)$. If definition intervals of Y and X are the same, $f: X^2 \mapsto X$ is a one-way quasi-commutative function such that $$f(x, \xi(x_1, x_2, \ldots, x_n)) = f(\xi(x_1, x_2, \ldots, x_n), x) = f(\xi(\pi(x_1, x_2, \ldots, x_n)), x).$$

Definition 2.4. A family of one-way accumulators is a family of one-way functions, where each function is quasi-commutative.

Next, another property of one-way accumulators is given.

Definition 2.5. Let $\mathcal{Y}_j = \xi(y_1, \ldots, y_{j-1}, y_{j+1}, \ldots, y_n)$ and $\Gamma_j = f(x, \mathcal{Y}_j)$. Then $$\Gamma = f(x, \mathcal{Y}) = f(\Gamma_j, \xi(y_j)). \tag{1}$$

It follows from Definition 2.3 that equation (1) is true in the case of permutation as well.

If $\mathcal{Y}_{90} = \xi(\pi(y_1, y_2, \ldots, y_n))$, then $$64 = f(x, \mathcal{Y}_\pi) = f(\Gamma_j, \xi(y_j)).$$

For one-way accumulators it is essential that $\lg \Gamma \approx \lg y_j$.

It is assumed that $x, f(\cdot, \cdot)$ and the set $\{y_1, y_2, \ldots, y_n\}$ are given. There are n participants, and each of them is associated with one of elements of the given set. Then $\Gamma = f(x,y)$. An owner of $y_j$ can compute $\Gamma_j = f(x, \mathcal{Y}_j)$. Subsequently, by submitting the pair $\{\Gamma_j, y_j\}$, a j-th participant can prove that $y_j$ belongs to the set by checking $\Gamma \stackrel{?}{=} f(\Gamma_j, \xi(y_j))$. On the other hand, in order to successfully force a certain y', an intruder has to solve a hard computational problem and find such x' that $\Gamma = f(x', \xi(y'))$. It should be noted that elements of the set are not secret, because all of them are used in computing $\Gamma$.

In [1] it is noted that one-way accumulators can be considered as some alternative to digital signatures (DSs). In fact, if each participant stores $\Gamma$ in a local long-term memory, it is sufficient to submit $\{\Gamma_j, y_j\}$ in order to prove authenticity of $y_j$. Respective verification can be performed by someone who knows $f(\cdot, \cdot)$ and has access to $\Gamma$.

2.1. Exemplary Practical Implementation

The following practical problem is considered herein. Let there is a certain local community formed by participants of a scientific conference, for example. Besides the participants, there is a trusted registration authority. Each participant passes through a registration procedure and is given a unique registration identifier. Different types of interaction are possible:

Between registered participants within the local community.

Between the registered participants and all the others.

It is assumed that fully functional operation is only possible when an entity can prove that he/she belongs to the local community. Several solutions exist.

The easiest one is to make a list of identifiers and to distribute it among interested entities. Disadvantages are obvious: a substantial part of expenses refers to the accompanying overhead that arises when transmitting and storing the list. Thus, if only registered participants have access to the list, then the overhead is associated with ensuring privacy and integrity of information distributed via unprotected channels and saved in memory of personal devices of the participants. Moreover, it is not possible to avoid disclosure of the identifiers in the case of proving membership in the local community when a registered participant interacts with extraneous (unregistered) entities. Let the registration authority certifies identifiers with an DS, and then provides them to participants along with the signature. Anyone can verify the signature using a public key of the registration authority. Validity of the signature confirms the fact of membership in the local community. Now, anyone can perform this verification, even a non-registered entity. However, in this case the identifiers are transmitted openly and their privacy is not ensured.

The basic conditions to be met when solving the problem outlined above are given hereinbelow:

1. A valid proof of the fact that a registered participant owns an identifier.
2. Keeping the identifier secret when interacting with both a non-registered entity and another registered participant.

The solution scheme based on one-way accumulators is generally described thereafter. Let there are n participants. A function $f$ is given. Each participant is given a registration identifier $y_j$, $j=\overline{1,n}$. Then, the participants exchange with the identifiers and calculate an accumulated value $\Gamma$. A participant with number j knows $f$ and stores $y_j$, $\Gamma_j$ in memory of his/her personal computing device. The function $f$ and $\Gamma$ are publicly available. In order to prove membership in the local community, it is required to submit a certain pair $\{z, \tilde{\Gamma}_j\}$. Any interested party can perform the following check: $f(\Gamma_j, \xi(z)) \stackrel{?}{=} \Gamma$. Equality means that the membership is confirmed. It should be noted that it is not necessary to store $\Gamma$, since every participant has access to the pair $\{y_j, \Gamma_j\}$ and, therefore, can always compute $\Gamma$ by using $f$. However, if the check is performed by extraneous entities, then they must know $f$ and have access to $\Gamma$. Thus, any participant can prove his/her membership in the local community without disclosing identifiers.

The solution of this task by using the interactive witness hiding protocol is described in Section 7.

In [5] an alternative solution is proposed, however, lgn different values are required to verify membership, and if each of them is obtained by means of a $\lambda$-bit cryptographic hash function, then at least $\lambda$lgn bits of memory are required to store them. Asymptotic verification complexity is O(lgn).

For one-way accumulators, the memory amount and verification complexity are constant values which do not vary over time and do not depend on n.

3. ELLIPTIC CURVES OVER

An elliptic curve E over a finite field $\mathbb{F}_p$ is denoted as $E/\mathbb{F}_p$, p>3 is an odd prime. Let an additive group of points $E(\mathbb{F}_p)$ of an order $\#E(\mathbb{F}_p)$ is set on $E/\mathbb{F}_p$.

$$E(\mathbb{F}_p) = \{(x,y) \in \mathbb{F}_p \times \mathbb{F}_p: y^2 - x^3 - ax - b = 0\} \cup \infty; a, b, \in \mathbb{F}_p,$$

where $\infty$ is a point at infinity, and $Q+\infty=\infty+Q=Q$ for all $Q \in E(\mathbb{F}_p)$. The point Q has coordinates $(x_Q, y_Q)$ and $Q+(-Q)=(x_Q, y_Q)+(x_Q, -y_Q)=\infty$.

The point G of a prime order in is also set, where said order is such that $m|\#E(f_p)$. It means that G generates a subgroup $E[m]$ of the prime order m (m-torsion points) of the additive group of points $E(\mathbb{F}_p)$. In case of $\mathbb{F}_p$ we have:

$$E/\mathbb{F}_p: y^2 = x^3 ax + b. \quad (2)$$

Order of group $E(\mathbb{F}_p)$. Let the curve $E/\mathbb{F}_p$ is given and $|E(\mathbb{F}_p)| = \#E(\mathbb{F}_p)$. Then $p+1-2\sqrt{p} \leq \#E(\mathbb{F}_p) \leq p+1+2\sqrt{p}$. (see [6], subsection 13.1.8)

Otherwise, if $E/\mathbb{F}_p$ is given, then $\#E(\mathbb{F}_p)=p+1-t$, where $|t| \leq 2\sqrt{p}$. Since $2\sqrt{p}$ is small compared to P, then $\#E(\mathbb{F}_p) \approx p$.

In [73], a method for computing $\#E(\mathbb{F}_p)$ in $O(\lg^8 p)$ bit operations is provided. A high score for $p=10^{499}+153$ has been registered.

Example. for $\#E(\mathbb{F}_p) \approx 2^{255} - 2^{128.5}$ for $E/\mathbb{F}_p: y^2 = x^3 + 486662 + x$, $p=2^{255}-19$, $G=x_G=9$ and $m=2^{252}+27742317777372353535851937790883648493$.

Scalar product. Scalar product $Q=[\ell]G$ is introduced such that $$Q = \underbrace{G + G + \ldots + G}_{\ell}, \quad [-\ell]G = [\ell](-G),$$

$[0]G=\infty$

Let $\ell = a+b$. $Q=[a]G+[b]G=[\ell]G$. $[c]Q=[c\ell]G=[ca+cb]G$.

Example. It is assumed that $\ell=151_{10}=10010111_2$. Then $Q=[151]G=[2^7]G+[2^4]G+[2^2]G+[2^1]G+[2^0]G$.

1. Now let us take the point G.
2. If we double G, we get $[2]G$, $\Sigma_1=[2]G+G$.
3. If we double $[2]G$, we get $[2^2]G$, $\Sigma_2=[2^2]G+\Sigma_1$.
4. If we double $[2^2]G$, we get $[2^3]G$.
5. If we double $[2^3]G$, we get $[2^4]G$, $\Sigma_3=[2^4]G+\Sigma_2$.
6. If we double $[2^4]G$, we get $[2^5]G$.
7. If we double $[2^5]G$, we get $[2^6]G$.
8. If we double $[2^6]G$, we get $[2^7]G$, $\Sigma_4=[2^7]G+\Sigma_3$.

To sum up, the computation of the scalar product $[151]G$ requires seven doubling operations and four additions. More efficient methods for computing the scalar product are known (see [6], subsection 13.1.2).

Addition and doubling (affine coordinates) [6] (13.2.1.a). A point $A=(x_A, y_A)$ matches a paired point $-A=(x_A, -y_A \mod p)$. If A and B are different points, such that $A \neq \pm B$, then $A+B=C$, where $$s = \frac{y_B - y_A}{x_B - x_A} \quad (\bmod p),$$

-continued $$x_C = s^2 - x_A - x_B \pmod{p},$$

$$y_C = -y_A + s(x_A - x_C) \pmod{p}.$$

If $y_B \neq 0$, then $2B=D$, where $$s = \frac{3x_B^2 + a}{2y_B} \pmod{p},$$

$$x_D = s^2 - 2x_B \pmod{p},$$

$$y_D = -y_B + s(x_B - x_D) \pmod{p}.$$

a is a parameter of the curve $E/\mathbb{F}_p$: $y^2 = x^3 + ax + b$.

Example 1. $A+B=C$, $A=(2,0)$ and $B=(1,3)$ are to be calculated.

$$s = \frac{y_B - y_A}{x_B - x_A} \pmod{p} = \frac{3}{-1} \pmod{17} = 14,$$

$$x_C = s^2 - x_A - x_B \pmod{p} = 196 - 2 - 1 \pmod{17} = 193 \pmod{17} = 6,$$

$$y_C = -y_A + s(x_A - x_C) \pmod{p} = 0 + 14(2-6) \pmod{17} = -56 \pmod{17} = 12.$$

$C = (6, 12)$.

Example 2. $2B=D$, $B=(1,3)$.

$$s = \frac{3x_B^2 + a}{2y_B} \pmod{p} = (3+1) \times 6^{-1} \pmod{17} = 4 \times 3 \pmod{17} = 12,$$

$$x_D = s^2 - 2x_B \pmod{p} = 144 - 2 \pmod{17} = 142 \pmod{17} = 6,$$

$$y_D = -y_B + s(x_B - x_D) \pmod{p} =$$

$$-3 + 12 \times (1-6) \pmod{17} = -63 \pmod{17} = 5.$$

$D = (6, 5)$.

There are other known coordinate systems: projective, Jacobian, Chudnovsky-Jacobian, modified Jacobian, and mixed coordinate systems [6] (see subsections 13.2.1.b, 13.2.1.c, 13.2.1.d, 13.2.2). The choice of a coordinate system influences complexity of computing a sum and doubling points.

Compact representation of a point of the curve (affine coordinates) [6] (13.2.5). The equation for the point $Q \in E[m]$ can be interpreted as $y_Q^2 \equiv r \mod p$, where r is a quadratic residue, and in this case exactly two solutions exist: $\pm y_Q \in \mathbb{F}_p$. If $y_Q < p$, the solution is $-y_Q \mod p = p - y_Q$. If $y_Q$ is even, then $(p - y_Q)$ is odd, and vice versa. In general, one of the two solutions is always even, while the other one is always odd.

Let Q is represented by the coordinate $x_Q$. $(x_Q, \mathfrak{H})$ is saved, where $\mathfrak{H}$ is a feature that enables to identify the required solution from the pair of possible ones. The feature $\mathfrak{H}=0$ is indicative of parity, and the feature $\mathfrak{H}=1$ is indicative of oddness. For example, for $(x_Q, 1)$, the pair $\{y_Q, p-y_Q\}$ should be obtained, and then the odd solution should be selected from this pair.

$\lceil \lg p \rceil$ bits of memory are required to store an arbitrary point of the curve. In $\mathbb{F}_p$, the square root is computed according to the Tonelli-Shanks algorithm [6] (see subsection 11.1.5) having asymptotic complexity of $O(\lg^2 p)$.

4. BILINEAR MAPPINGS

Let us use an alternative designation $G_1$ for $E[m]$ with the generator $G_1$. Let $\mathbb{G}_3$ is a subgroup of the prime order m of the multiplicative group of $\mathbb{F}_{p^k}$ with the generator g for some $k>1$. Mapping $e_m(\cdot,\cdot)$: $\mathbb{G}_1 \times \mathbb{G}_1 \mapsto \mathbb{G}_3$ is referred to as symmetric pairing. Since $E(\mathbb{F}_p) \approx \mathbb{Z}_m \oplus \mathbb{Z}_m$, there are two generators $G_1$ and $G_2$. It means that there is also asymmetric pairing $\hat{}_m(\cdot,\cdot)$: $\mathbb{G}_1 \times \mathbb{G}_2 \mapsto \mathbb{G}_3$ where $\mathbb{G}_1 = \langle G_1 \rangle$, $\mathbb{G}_2 = \langle G_2 \rangle$ are different subgroups of the prime order m. From [7] it follows that symmetric pairing can be used in cryptographic applications along with asymmetric pairing.

Several different types of pairing are known, for example, Weil pairing or Tate-Lichtenbaum pairing [8], [9], [10]. The latter type is applied in practice more often. Bilinear mappings are discussed in detail in [6] (Chapter 6).

The following properties of symmetric pairing are interesting:

1. Bilinearity. For all v, ψ, $\ell_1, \ell_2 \in \mathbb{N}$ and $S_1, S_2, P, Q \in \mathbb{G}_1$, where $P=[v]G_1$ и $Q=[\psi]G_1$, the following is true:

$$e_m([\ell_1]P, [\ell_2]Q) = e_m([\ell_2]P, [\ell_1]Q) = e_m(P, Q)^{\ell_1 \ell_2 \pmod{m}} =$$
$$= e_m(G_1, G_1)^{\psi v \ell_1 \ell_2 \pmod{m}} = g^{\psi v \ell_1 \ell_2 \pmod{m}}$$
$$e_m(S_1 + S_2, P) = e_m(P, S_1 + S_2) = e_m(S_1, P) e_m(S_2, P).$$

2. Non-Degeneracy. $e_m(P, Q) = e_m(P', Q)$, if and only if $P=P'$, where Q, P, P' $\in \mathbb{G}_1$, and Q is selected randomly. If $e_m(P, Q)=1$, then $(Q=\infty) \vee (P=\infty)$ 3. Computability. A method of computing $e_m(\cdot, \cdot)$ of polynomial complexity is known, and $O(\lg p)$ bits of memory are enough for storing the result (computation methods for different types of pairing are given in [11]).

The embedding degree for Weil pairing refers to the smallest integer k such that $E/\mathbb{F}_{p^k}$ contains all points $E[m]$ or $E[m] \subseteq E(\mathbb{F}_{p^k})$. The embedding degree for Tate-Lichtenbaum pairing is the smallest integer k such that $m | p^k - 1$.

Some special elliptic curves, such as supersingular curves (in case of equation (2) $p \equiv 3 \pmod 4$) provide the embedding degree $k \leq 6$ [12]. Said limitation is true for finite fields with characteristic 3 but not 2, where $k=4$ [13] (see subsection 5.2.2). In [14] it is shown that it is possible to build ordinary (non-supersingular) curves, where $k \in \{3, 4, 6\}$.

Definition 4.1. A problem is called "easily solvable" if it can be solved with a polynomial complexity algorithm. In other words, the computation time is limited by a polynomial function of the number of binary symbols at the algorithm input. A problem for which such an algorithm is not known will be referred to as a hard one.

Subexponential complexity is such a complexity which is asymptotically more efficient (lower) than exponential complexity, but is not efficient as compared to polynomial complexity.

Definition 4.2. $\langle g \rangle$ of the prime order m and $h \in \langle g \rangle$ are given. The discrete logarithm problem (DLP) is to find $\ell \in \mathbb{Z}$ such that $h = g^\ell$. For the DLP, subexponential complexity solutions are known [15], [16].

Definition 4.3. $\langle G \rangle$ of the prime order m and $Q \in \langle G \rangle$ are given. The elliptic curve discrete logarithm problem (ECDLP) is to find to find $\ell \in \mathbb{Z}$ such that $Q=[\ell]G$. Currently, for the ECDLP, exponential complexity solutions are known [17].

Cryptographic security directly depends on complexity of solving the DLP/ECDLP. For symmetric pairing, cryptographic security in $G_1$ is determined by cryptographic security in $G_3$. In [12], [9] it is shown that solving the ECDLP can be reduced to solving the DLP in $\mathbb{F}_{p^k}$, provided the curve is supersingular and $k \le \lg p$. The reduction method is applicable to different types of curves [26], [27], [28]. As a result, plural curves, which had originally been proposed as a basis for constructing cryptographic systems, such as supersingular curves or single-trace curves ($\#E\,(\mathbb{F}_p)=p$), were rejected due to low cryptographic security, since the reduction method allowed to solve the DLP in subexponential or even linear time.

For asymmetric pairing $G_1 \times G_2 \mapsto G_3$, solving the ECDLP in $G_1$ is also reduced to solving the DLP in $G_3$—to this end, it is required to find a point $P' \in G_2$ such that mapping $G_1 \mapsto e_m(G_1, P')$ is injective and forms homomorphism of $G_1$ in $G_3$. Consequently, instead of solving the ECDLP in $G_1$, it is possible to transition the solving into $G_3$, where complexity thereof may be lower.

Basically, the reduction method comprises constructing suitable bilinear mapping. Weil/Tate-Lichtenbaum pairing has polynomial complexity in k and lg P. On the one hand, the smaller k is, the lower the complexity of computation of pairing is; on the other hand, solutions of subexponential complexity are known for the DLP, and they are the more efficient, the smaller k is.

When a constructive application of $e_m(\cdot,\cdot)$ is implied, then p, m, $E/\mathbb{F}_p$, k should be selected in such a way that an acceptable level of cryptographic security is ensured based on balanced complexity of solving the DLP in $G_3$ and the ECDLP in $G_1$, provided k is not too high. For example, $p^k \sim 2^{1024}$ should be selected in order to provide an 80-bit level of cryptographic security. The method of finding elliptic curves with large order and small embedding degree that is based on complex multiplication [6] (Section 18) is proposed in [20], [21] and additionally studied in [22], [23], [24], [14]. Supersingular curves are suitable for these purposes, however, as shown in [6] (subsection 6.4.2), the upper bound for k substantially depends on P, in particular:
1. If p=2, then k≤4.
2. If p=3, then k≤6.
3. If p≥5, then k≤2.

For example, for P≥5, this means that $P \sim 2^{512}$ should be selected in order to provide an 80-bit level of cryptographic security, since for this level $p^k \sim 2^{1024}$. It should be obvious that such a selection adversely affects complexity of computation of $e_m(\cdot,\cdot)$.

There are special embedding degrees for finite fields with characteristics 2 and 3. In [25], efficient techniques are proposed for $\mathbb{F}_{2^{4d}}$ and $\mathbb{F}_{3^{6d}}$, where d is a prime integer, which allow to select such an elliptical curve that k=6 and $p \sim 2^{170}$. Then, complexity of solving the DLP in a subgroup of a prime order $\mathbb{F}_{p^k}^*$, where $p^k \sim 2^{1024}$, guarantees 80-bit cryptographic security.

Another approach to solving the problem is to use hyperelliptic supersingular curves or build ordinary curves with a suitable embedding degree [6] (subsections 24.2.2 and 24.2.3).

Let $\alpha, \beta, \gamma \in \mathbb{Z}$ are given.

Definition 4.4. The computational Diffie-Hellman problem (CDH) for $P1=[\alpha]G_1$ and $P2=[\beta]G_1$ is to find $Q \in G_1$ such that $Q=[\alpha\beta\,(\text{mod}\,m)]G_1$. The designation $\text{CDH}_{G1}$ (P1, P2)=Q is introduced. The designation $\text{CDH}_g(g^\alpha, g^\beta)=g^{\alpha\beta\,mod\,m}$ will be used for $G_3$.

Complexity of solving the CDH problems is not harder than complexity of solving the DLP/ECDLP—it is obvious that, in order to solve the CDH problem, it is enough to compute one discrete logarithm. Therefore, if the CDH problem is hard for some group, then it means that the DLP/ECDLP is also hard in this group. However, it has not been formally proven that complexity of the DLP ensures complexity of the CDH problems. Equivalence of complexity of the CDH and the ECDLP has been proven for groups of the prime order m [30], [31]. In particular, it has been proven that the assumption of equivalence is true if an elliptical curve with specified properties can be built over a certain prime field. The proof does not guarantee equivalence in the general case, since for a random group the method of building such curves is not known.

Definition 4.5. The decision Diffie-Hellman (DDH) problem for $[\alpha]G_1, [\beta]G_1, [\gamma]G_1$ is to make a decision regarding the equation $[\gamma]G_1 \stackrel{?}{=} [\alpha\beta]G_1$. If $\text{CDH}_{G1}([\alpha]G_1, [\beta]G_1)=[\gamma]G_1$, then $\text{DDH}_{G1}([\alpha]G_1, [\beta]G_1, [\gamma]G_1)=1$, and $\text{DDH}_{G_1}([\alpha]G_1, [\beta]G_1, [\gamma]G_1)=0$ otherwise.

It is obvious that, in the best case, complexity of solving the CDH is as hard as the DDH: first $P=\text{CDH}_{G_1}([\alpha]G_1, [\beta]G_1)$ is to be obtained, then $P \stackrel{?}{=} [\alpha\beta]G_1$ is to be verified. However, for most known groups, it has not been proven that complexity of solving the DDH is lower than complexity of solving the CDH.

Definition 4.6. The gap Diffie-Hellman (GDH) problem for $[\alpha]G_1, [\beta]G_1$ is to solve $\text{CDH}_{G_1}([\alpha]G_1, [\beta]G_1)$ with the help of the DDH oracle.

The DDH oracle gives an answer to a question formulated in the context of the DBE problem, in particular $\text{DDH}_{G_1}(\text{P1}, \text{P2}, \text{P3})$, for certain $P^1, P^2, P3 \in G_1$. Since it is required to find a solution of the CDH for the GDH, then the GDH is not harder than the CDH. However, it would be incorrect to state that complexity of solving the GDH is significantly lower than complexity of solving the CDH, since this fact has not been proven [29]. Groups in which the CDH is hard, while the DDH is easily solvable will be referred to as GDH groups.

Definition 4.7. The bilinear Diffie-Hellman (BDH) problem for $[\alpha]G_1, [\beta]G_1, [\gamma]G_1$ is to calculate $e_m (G_1, G_1)^{\alpha\beta\gamma\,(mod\,m)}$.

The designation $\text{BDH}_{G_1}([\alpha]G_1, [\beta]G_1, [\gamma]G_1)=e_m(G_1, G_1)^{\alpha\beta\gamma(mod\,m)}$ is introduced.

It is obvious that complexity of solving the BDH is not harder than the CDH in $G_1$, i.e. for a given $P=\text{CDH}_{G_1}([\alpha]G_1, [\beta]G_1)$, $e_m(P, [\gamma]G_1)=e_m(G_1, G_1)^{\alpha\beta\gamma\,(mod\,m)}$ can be easily calculated (the same is true for $P=\text{CDH}_{G_1}([\alpha]G_1, [\gamma]G_1)$ and $P=\text{CDH}_{G_1}([\beta]G_1, [\gamma]G_1)$). The BDH also depends on complexity of solving the CDH in $G_3$. For instance, in order to calculate $e_m(G_1, [\alpha]G_1)=g^\alpha$ and $e_m([\beta]G_1, [\gamma]G_1)=g^{\beta\gamma(mod\,m)}$, it is necessary to find a solution for $\text{CDH}_g(g^\alpha, g^{\beta\gamma\,(mod\,m)})=g^{\alpha\beta\gamma(mod\,m)}=e_m(G_1, G_1)^{\alpha\beta\gamma(mod\,m)}$ which is simultaneously a solution for the BDH. Therefore, complexity of solving the BDH depends on complexity of solving the CDH in both $G_1$ and $G_3$. Equivalence of complexity of solving the BDH and the CDH in $G_1$ and $G_3$ has not been proven. A method for solving the BDH in $G_1$ without preliminarily solving the CDH in $G_3$ is not known.

There is a direct connection between pairing and the GDH. As follows from non-degeneracy of pairing and cyclicity of $G_3$, $e_m(G_1, G_1)$ generates $G_3$. Therefore, pairing allows to solve $DDH_{G_1}$ ($[\alpha]G_1$, $[\beta]G_1$, $[\gamma]G_1$) in $G_1$ (to make a decision regarding $CDH_{G_1}$ ($[\alpha]G_1$, $[\beta]G_1$) $\stackrel{?}{=} [\gamma]G_1$). Due to bilinearity, we have the following:

$$e_m([\alpha]G_1, [\beta]G_1) = e_m(G_1, [\beta]G_1)^\alpha = e_m(G_1, [\alpha\beta]G_1) = e_m(G_1, [\gamma]G_1),$$

if and only if $\alpha\beta = \gamma$. Thus, for symmetrical pairing, the DDH in $G_1$ is an easily solvable problem. Since it is assumed that the CDH is equivalent in computational hardness to the ECDLP, $G_1$ belongs to GDH groups.

As an example, let us consider the implementation of a DS based on a GDH group [32]. It should be noted that a similar DS scheme was first proposed for a group with a hard computational solution of the DDH [33]. The one who generates a DS will be referred to hereinafter as "authenticator".

Let $G_1$, $G_3$, $e_m(\cdot,\cdot)$ and a hash function H: $\{0,1\}^* \mapsto G_1$ are given [32].

An authenticator selects a private key $s \in_R (0, m-1]$ and then computes a public key $P=[s]G_1$. It is assumed that a message $M \in \{0,1\}^*$ should be signed. Then the authenticator performs the following actions:
1. Computes $Q=H(M)=[x]G_1$.
2. Computes a signature $S=[s]Q=[sx \pmod m]G_1$.

A verifier has a message M' and performs the following actions to verify a signature S':
1. Computes $Q'=H(M')$.
2. Verifies $e_m(P, Q') \stackrel{?}{=} e_m(G_1, S')$.

If $Q'=Q=[x]G1$ and $S'=S=[sx \pmod m]G_1$, then, due to bilinearity, $e_m(P,Q')=e_m([s]G_1,[x]G_1)=e_m(G_1,[sx \pmod m]G_1)=e_m(G_1,G_1)^{sx \pmod m}=g^{sx \pmod m}$. By construction, $g^{sx \pmod m} \in G_3$. If $Q' \neq Q$ and/or $S' \neq S$, then $e_m(P,Q') \neq e_m(G_1,S')$.

Tampering of the signature is possible if an intruder is able to solve $CDH_{G_1}(P,Q)=CDH_{G_1}([s]G_1, [x]G_1)=[sx \pmod m]G_1=S$. Therefore, the CDH should be not less hard than the ECDLP. On the other hand, verification of the signature is in solving the DDH, therefore, the latter one should be easily computable. The signature is considered to be confirmed if $DDH_{G_1}(P, Q', S')=1$, and it is rejected if $DDH_{G_1}(P, Q', S')=0$.

Note 1. It follows from the aforesaid that the usage of pairing for constructive purposes makes sense only in those cases when the usage of a GDH group is essential for implementing necessary properties of a cryptographic transformation.

5. ONE-WAY ACCUMULATORS ON $E/\mathbb{F}_p$

Based on pairing. Let $G_1=\langle G_1 \rangle$, $G_3=\langle g \rangle$, $e_m(\cdot,\cdot)$, a point P, and a set of points $\{S_1, \ldots, S_n\}$, $S_i, P \in G_1$ are given. It is assumed that $S_i=[x_i]G_1 \sqcup P=[\phi]G_1$, $x_i, \phi \in_R (0, m-1]$, due to bilinearity:

$$e_m\left(\sum_{i=1}^n S_i, P\right) = e_m\left(P, \sum_{i=1}^n S_i\right) = \prod_{i=1}^n e_m(S_i, P) = \prod_{i=1}^n e_m([x_i]G_1, [\psi]G_1) =$$

$$= \prod_{i=1}^n e_m(G_1, G_1)^{\phi x_i \pmod m} = g^{\psi \sum_{i=1}^n x_i \pmod m} = \tilde{g}.$$

The accumulated value $\tilde{g} \in G_3$ is invariant regarding the random permutation $x_i$ and is therefore invariant regarding the similar permutation $S_i$.

It is assumed that $$g_j = e_m\left(\sum_{i=1}^{j-1} S_i + \sum_{i=j+1}^n S_i, P\right) =$$

$$e_m(G_1, G_1)^{-\phi x_j \pmod m}\tilde{g} = g^{\phi\left(\sum_{i=1}^{j-1} x_i + \sum_{i=j+1}^n x_i\right) \pmod m}.$$

Then, by construction, $\tilde{g} = e_m(G_1, G_1)^{\phi x_j \pmod m} g_j$.

If the parameters $p$, $m$, $E/\mathbb{F}_p$, $k$ have been selected in such a way that complexity of solving the DLP in $G_3$ is not lower than complexity of solving the ECDLP in $G_1$ and $\phi$ is unknown, then $\tilde{g}$ is a one-way accumulator, since, in order to find $\phi$, it is required to solve the DLP under condition of $\tilde{g}$.

Based on scalar product. Let $G_1=\langle G_1 \rangle$, $Q=[\Gamma]G_1$ is given, where $\Gamma=\Pi_{i=1}^n x_i \pmod m$ and $\Gamma_j=x_j^{-1}\Gamma \pmod m)=\Pi_{i=1}^{j-1}x_i\Pi_{i=j+1}^n x_i \pmod m$.

Then, by construction, $Q=[x_j\Gamma_j \pmod m]G_1=[\Gamma]G_1$. It is obvious that the point Q is invariant regarding the random permutation $x_i$.

If $v \in_R (0,m-1]$ is unknown, then scalar product $Q'=[v]Q=[v\Gamma \pmod m]G_1$ is a one-way accumulator, since, in order to obtain b, it is required to solve the ECDLP under condition of Q'. If the compact point representation is used (see Section 3), then storage of the curve point requires k times less bits of memory, as compared to the pairing.

Note 2. As follows from the disclosure given in [32], at the 160-bit level of cryptographic security, scalar product for a point of the curve is at least 16 times more efficient than pairing. The time taken by verification of a signature for the ECDSA and Boneh-Lynn-Shacham (BLS) algorithms was compared (5.17 ms vs 81.0 ms with PIII 1 GHz). The signature verification using the ECDSA algorithm is comprised of a sum of two scalar products, as well as of three multiplications and multiplicative inversion in $\mathbb{F}_m^*$, while the signature verification according to the BLS algorithm comprises computing two pairings.

6. ZERO-KNOWLEDGE PROOF

A certain z, a secret associated therewith, and a set X are given. There are two participants:

(Prover) is someone who attempts to convince an opposite party that he/she owns $z \in X$, and provides some witness to this end.

(Verifier) is someone who accepts/rejects the provided witness.

The prover has some information which is stored in secret. Verification is performed by using public data. Both the prover and the verifier will be referred to as honest if they observe the order of selection of variables, as defined by the protocol, follow the specified rules of computations, and carry out targeted transmission of messages. Nevertheless, the possibility of deception by the prover is admitted, for example, he/she may attempt to convince the verifier that he/she owns z, while he/she does not actually know the associated secret. On the other hand, the verifier, or any other intruder, acting as the prover may use a transcription (data transmitted in interaction according to the protocol) of a particular implementation or a combination of different implementations of the protocol to prove the fact of owning z. It is also assumed that the intruder intends to disclose z and/or the associated secret.

Zero-Knowledge Proof (ZKP) is an interactive protocol for two participants that has the following properties [34], [35]:

Completeness. If the prover knows the associated secret, then he/she can prove the fact of owning z, and this proof will be accepted with overwhelming likelihood (rejected with negligibly small likelihood).

Soundness. If the prover does not know the associated secret, then the fact of owning z can be proven by him/her with negligibly small likelihood (the proof will be rejected with overwhelming likelihood).

Zero-Knowledge. The verifier (or the intruder) does not retrieve any information about z and/or associated secret after analyzing stored transcripts of various implementations of the protocol, while available information can be obtained by means of a certain polynomial-complexity algorithm, not involving interactive interaction when doing this.

The prover selects some random secret variable with a discrete uniform distribution (commitment) and computes a randomized public witness based on this variable. It is done to guarantee uniqueness of data of a current session. In addition, the witness is used to verify a response to the challenge which is made during the session and formulated by the verifier in the form of a random variable with a discrete uniform distribution. The prover provides his/her response to the challenge made, and sends the response to the opposite party which verifies it. It is crucial that all the three above-mentioned components (witness, challenge, and response) are used in the verification. The protocol is configured in such a way that only the one who knows the associated secret is indeed able to respond to the challenge; moreover, the received response does not disclose any information (even partially) about this secret and z. During the session, the only bit of information is disclosed whose value indicates one of two possible outcomes: whether the prover owns $z \in X$ or not. In order to minimize the probability of fraud by the prover, the protocol may be repeated several times.

Generally, the protocol is comprised of three messages, and exchange thereby is shown in FIG. 1.

Identification protocols. There are many different identification protocols. The most known are [36], [37], [38], [39], [41], [42]. The protocols solve the same task but in different ways: by means of interactive interaction, the prover tries to convince the verifier that he/she knows a secret which is not disclosed during this interaction. For some protocols, e.g. [36], the property of ZKP is rigorously proven, for others, e.g. [39], such proof does not exist. For a number of protocols, e.g. [42], the WI (Witness-Indistinguishability) and WH (Witness Hiding) properties are proven. The WI property means that the verifier is unable to identify which witness is used during a current session, even if he/she has access to all such witnesses used in previous sessions (for example, stores the witness of each individual session in long-term memory). The WH property means that the verifier is unable to compute himself/herself a new witness which is relevant in the context of the protocol being implemented, but is different from the one previously submitted by the prover during any session. Since the WI and WH properties are related, the WI property is usually proven first, and then, based on this fact, the proof of the WH property is built.

In [43] it is shown that WH is a useful practical property and can be considered as an alternative to ZKP. It is known [43] that the ZKP property is not ensured if an intruder has access to transcripts of different sessions of the same ZKP protocol, which are carried out simultaneously (in parallel), and is able to actively intervene and influence the course of execution thereof. However, it is proven [43] that the WH property is preserved in this case. As compared to ZKP, WH ensures that the verifier does not retrieve any meaningful information which could help him/her act as the prover. Protocols with WH are usually more efficient than ZKP protocols, since they do not require multiple repetition to minimize the likelihood of fraud.

Identification protocols belong to a more common class of $\Sigma$-protocols that were first introduced in [44]. The prover and the verifier are simulated using a probabilistic interactive Turing machine, and a $\Sigma$-protocol itself is an interactive proof scheme in the style of the Arthur-Merlin game [48] in which the verifier always chooses a random variable with a discrete uniform distribution.

The following section describes the identification protocol that solves a different task—in particular, it enables to prove the fact of owning a secret that is indicative of membership in some local community. Furthermore, if the community consists of the only one participant, the protocol solves the same task as the known identification protocols. It should be noticed that an ideologically close task is described in [45], but the method according to the present invention differs from previously published ones.

7. VERIFICATION OF MEMBERSHIP IN A LOCAL COMMUNITY

Let $\Omega^*$ is a set of all sequences of letters of an arbitrary length in a finite alphabet $\Omega$ (set of letters). A $\lambda$-bit cryptographic hash function $h(\cdot)$ is given such that h: $\{0, 1\}^* \mapsto \{0, 1\}^\lambda$, and a secret $\beta \in_R (0, m-1]$, $2^{\lambda-1} < m < 2^\lambda$. There are n<m participants. Each participant has a unique registration identifier $a_i \in \Omega^*$. Let us provide identifiers as a set $X=\{x_1, \ldots, x_n\}$ such that $x_i=h(a_i\|h^i(\beta))$, where $a_i \in \Omega^*$, $x_i \in \mathbb{F}_{2^\lambda}$, and $$h^i(\beta) = \underbrace{h(h(\ \ldots\ h(h(\beta))\ \ldots\ ))}_{i\ times}, i = \overline{1, n}.$$

The described method of generating X ensures that all $x_i$ are different, and even if $a_i=a_j$, then $x_i \neq x_j$ at $i \neq j$, $1 \leq i, j \leq n$.

The author assumes that there is a trusted party T responsible for selection of parameters, preliminary computations, and data distribution. $\beta$, n, p, m, $G_1$, $G_3$, $e_m(\cdot, \cdot)$ are given. Then T performs the following actions:

1. Based on $a_i$, $\beta$ and with the help of $h^i(\cdot)$, generates and publishes the set $X=\{x_1, \ldots, x_n\}$, $i=\overline{1,n}$ (explanations regarding X are given in Section 8).
2. Computes $\Gamma=\Pi_{i=1}^n x_i \pmod{m}$.
3. Secretly provides an i-th participant with $\{x_i, P_i=[\beta\hat{\Gamma}_i \pmod{m}]G_1\}$, where $\Gamma_i=x_i^{-1}\Gamma \pmod{m}$, $i=\overline{1,n}$.
4. Secretly computes and then publishes a public group key $\tilde{g}=e_m([\beta\Gamma \pmod{m}]G_1, G_1)=g^{\beta\Gamma \pmod{m}}$. It is assumed that authenticity and integrity of $\tilde{g}$ are ensured by a DS. If Sign $(\cdot,\cdot)$ and VerifY$(\cdot,\cdot,\cdot)$ are functions for generating and verifying the DS, then a certificate $\{\mathcal{D}_T, \tilde{g}\, \mathfrak{I}\}$ is issued, where $\mathfrak{I} \to \text{Sign}(\mathcal{H}(\tilde{g}\|\mathcal{D}_T), \mathcal{S})$, $\mathcal{H}(\cdot)$ is a cryptographic hash function, $\mathcal{S}$ is a secret key of the trusted party T, $\mathcal{D}_T$ is information about T. Before using $\tilde{g}$, it is necessary to verify validity of $\mathfrak{I}$ by using $\mathfrak{B} \to \text{Verify}(\mathcal{H}(\tilde{g}\|\mathcal{D}_T), \mathfrak{I}, \mathcal{P})$ where $\mathcal{P}$ is a paired public key of the trusted party T, while the value of the variable $\mathfrak{B}$ is True when $\mathfrak{I}$ is valid, and False otherwise.

If T is not a certification authority within the current public key infrastructure, then a respective certificate is issued for $\mathcal{P}$.

5. Stores $\beta$ in secret.

Explanation 1. Let us explain the purpose of the long-term secret $\beta$ which is known only to T and used to compute $x_i$, $P_i$, and $\tilde{g}$. g. $B_y$ construction, T secretly provides the i-th participant with $\{x_i, P_i = [\beta \tilde{\Gamma}_i \pmod{m}]G_1\}$ and publishes $\tilde{g}$. It is emphasized at this point that nobody except T knows $\beta$, and it is necessary to solve the DLP under the condition of $\tilde{g}$ or the ECDLP under the condition of $P_i$ in order to disclose it. It should be noted that if the personal secret $P_i$ is disclosed, for example as a result of a leak, then it can be used to prove the fact of owning not only $x_i$, but also an arbitrary $x_j$ for all $j \neq i$, $1 \leq i$, $j \leq n$. Indeed, $P_j = [x_j^{-1} x_i]P_i = [x_j^{-1}\beta\Gamma \pmod{m}]G_1 = [\beta\tilde{\Gamma}_j \pmod{m}]G_1$. The following statements are true:

1. Since X is publicly available, anyone can attempt to prove their membership in the community with the help of $x_i$, but only the one who knows the personal secret $P_i$ can actually do it.
2. Anyone can compute $\Gamma$ and/or $\tilde{\Gamma}_i$, but, in order to compute $P_i$, it is necessary to known the secret $\beta$ which is known only to T.
3. Since the i-th participant does not know $\beta$, then he/she cannot compute the personal secret $P_i$ himself/herself.
4. As follows from public availability of the set X, the i-th participant can prove the fact of owning not only $x_i$, but also an arbitrary $x_j$ for all $j \neq i$, $1 \leq i$, $j \leq n$ (explanations are given in Section 8).
5. The participant with the number can verify soundness of $\tilde{g}$, since $\tilde{g} = e_m(P_i, [x_i]G_1) = e_m(G_1, G_1)^{\beta x_i \tilde{\Gamma}_i \pmod{m}} = g^{\beta \Gamma \pmod{m}}$.
6. T can verify that $a_i \in \Omega^*$ is a prototype of $x_i$, since $x_i = h(a_i\|h^i(\beta))$.

The prover initially knows z and the associated secret $P = [\beta \tilde{\Gamma} \pmod{m}]G_1$ where $\tilde{\Gamma} = \Pi_{x_j \in \tilde{X}} x_j \pmod{m}$, $\hat{X} = X\setminus z$, provided $z \in X$, while the verifier knows $\{\mathcal{D}_T, \tilde{g}\, \mathfrak{I}\}$ and X.

Protocol 7.1 Confirmation/disproof of the fact of owning $z \overset{?}{\in} X$

1. Protocol messages. The following messages are transmitted:

$\hat{1} \overset{\mathcal{A}}{\to} \hat{\imath}$: $P1 = [v]P = [v\beta \tilde{\Gamma} \pmod{m}]G_1$ $\hat{2} \overset{\mathcal{A}}{\leftarrow} \hat{\imath}$: $P2 = [\phi]G_1$ $\hat{3} \overset{\mathcal{A}}{\to} \hat{\imath}$: $g_1 = e_m([v+z \pmod m)]P, P2) = g^{\phi\beta(v\tilde{\Gamma}+\Gamma) \pmod m}$ 2. Actions of the parties. The prover $\hat{\mathcal{P}}$ tries to prove to the verifier $\hat{\imath}$ that he/she owns $z \in X$. To this end, (a) The prover selects $v \in_R (0, m-1)$ (commitment) and verifies fulfillment of the condition $([v] \neq \infty) \wedge ([v+z \pmod m)]P \neq \infty)$. If the condition is fulfilled, the prover computes the point P1 (witness); otherwise, the prover selects a new v.

(b) The verifier selects $\phi \in_R (0, m-1]$ and computes the point P2 (challenge).

(c) The prover verifies that $P2 \neq \infty$ and then computes $g_1$ (response).

(d) The verifier reads $\{\mathcal{D}_T, \tilde{g}, \mathfrak{I}\}$ from the public storage and verifies the signature $\mathfrak{I}$ with the help of $\mathfrak{B} \to \text{Verify}(\mathcal{H}(\tilde{g}\|\mathcal{D}_T), \mathfrak{I}, \mathcal{P})$, where $\mathcal{P}$ is the public key of T. If $\infty$) ($\mathfrak{B} = \text{True}$)$\wedge$(P1$\neq \infty$), then the verifier verifies $\tilde{g}^\phi g_2 \overset{?}{=} g_1$, where $g_2 = e_m(P1, P2)$ Equality confirms the fact of owning $z \in X$; otherwise, the proof is rejected.

Comment 1. The usage of a GDH group is explained hereinafter. The proof is accepted for given $g_1$, $g_2$, $\tilde{g}^\phi$ if $DDH_g(\tilde{g}^\phi, g_2, g_1)$, and rejected if $DDH_g(\tilde{g}^\phi, g_2, g_1) = 0$. Moreover, for the verification it is required to compute pairing, one discrete exponentiation, and product in $G_3$.

Comment 2. It is assumed that a transcription of each session is saved. The transcription includes P1, P2, and $g_1$. Question: can an intruder use a transcription of some session in order to fool an honest verifier during a new session? Anyone can act as the intruder, including the verifier. The intruder does not know v, but may or may not know $\phi$. Furthermore, the intruder follows the strategy comprising: sending P1 in the first message; receiving, from the honest verifier, $P2' = [\gamma]G_1$ such that $P2' \neq P2$ for a certain $\gamma \neq \phi$; and then sending, in the third message, such $g_1'$ that the verification condition with respect to $\gamma$ is met. It should be reminded at this point that authenticity/integrity of $\tilde{g}$ is guaranteed by the DS.

By construction, $g_1$ depends on $\phi$, however, $\gamma$ will be used in the verification. If $g_2$ is fixed, it is necessary to generate $g_1'$ in such a way that dependence on $\gamma$ is imparted thereby. If such dependence is lacking, then $\tilde{g}^\gamma g_2 \neq g_1'$.

By construction, $g^2 = e_m(P1, P2') = g^{\gamma v\beta\tilde{\Gamma} \pmod m}$. $g^\gamma = e_m(P2', G_1)$ is computed. It should be noticed that the fact of knowing $\phi$ does not give additional benefits, since, in order to achieve the desired result, it is required to solve $CDH_g(\tilde{g}, g^\gamma) = \tilde{g}^\gamma$ and then compute $g_1' = g_2 \tilde{g}^\gamma = g^{\gamma\beta(v\tilde{\Gamma}+\Gamma) \pmod m}$. Another approach is possible. $\hat{g} = e_m(P1, G_1)\tilde{g} = g^{\beta(v\tilde{\Gamma}+\Gamma) \pmod m}$ is computed. Then it is required to solve $CDH_g(\hat{g}, g^\gamma) = \hat{g}^\gamma = g_1'$. An alternative method is to solve the ECDLP under the condition of P2'. For the GDH group, all these solutions have the same computational complexity by construction.

Explanation 2. This subsection explains the necessity of pairing in step ❸ of Protocol 7.1. It is assumed that the prover, instead of $g_1$, computes and submits $P3 = [v+z \pmod m)]P = [\beta(v\tilde{\Gamma}+\Gamma) \pmod m]G_1$ to the verifier, then verification of $\tilde{g}^\phi e_m(P1, P2) \overset{?}{=} e_m(P3, P2)$ is performed. Since P3 does not depend on $\phi$, the intruder may initiate a new session and fool the verifier by using P1 and P3 in steps ❶ and ❸, respectively. If pairing is used to compute $g_1$, the intruder has to solve $CDH_g(\tilde{g}, g^\gamma) = \tilde{g}^\gamma$ with known $\{P1, g_1, g^\gamma\}$ in order to fool the verifier (see Comment 2).

Explanation 3. The question may arise: why is the challenge set as the point P2? It is assumed that the verifier sends $\phi$ instead of P2, and the prover computes $g_1 = e_m([v+z \pmod m)]P, G_1)^\phi = g^{\phi\beta(v\tilde{\Gamma}+\Gamma) \pmod m}$. The verification is performed according to the rule: $\tilde{g}^\phi e_m(P1, G_1)^\phi \overset{?}{=} g_1$. Then, with known $\{P1, \phi, g_1\}$, the intruder may fool the verifier by first sending P1 and receiving some $\gamma \neq \phi$ in reply, and then computing $g_1' = g_1^{\phi^{-1}\gamma} = g^{\gamma\beta(v\tilde{\Gamma}+\Gamma) \pmod m}$. The verification will show that the intruder owns z, since $\tilde{g}^\gamma e_m(P1, G_1)^\gamma = g_1'$ although in fact it is not true. If P2 is sent, then, in order to achieve the goal, the intruder must solve the ECDLP under the condition of P2.

Explanation 4. It is explained herein why $\tilde{g}$ is computed via pairing. It is assumed that T stores $Q = [\beta\Gamma \pmod m]G_1$ rather than $\tilde{g}$ in the public storage. Then the proposed method of proving ownership by using Protocol 7.1 becomes meaningless, since anyone can compute $g_1 = e_m(P1+Q, P2) = g^{\phi\beta(v\tilde{\Gamma}+\Gamma)}$ for given P1, P2.

It is obvious that, in order to disclose $\beta$, it is necessary to solve the ECDLP under the condition of Q or P. However, if X is known (see explanations in Section 8) and the task is to find a secret P for some $z \in X$, then $P = [z^{-1}]Q$. If $\tilde{g} = e_m([\beta\Gamma \pmod m]G_1, G_1)$, then $\tilde{g}^{z^{-1}} = g^{\beta\tilde{\Gamma}}$ can be computed, but in this case complexity of finding P is not less than complexity of solving the DLP or the ECDLP under the condition of P or Q.

Comment 3. It is shown herein that Protocol 7.1 satisfies the properties according to Section 6.

Completeness. $\forall (z \in X) \wedge (P = [\beta\hat{\Gamma} g \pmod m]G_1) \wedge (v, \phi \in_R (0, m-1))$, $\tilde{g}^{\phi}g_2 = g_1$ by construction. In every new session, the honest prover and verifier use a one-time secret randomizer v and a unique $\phi$, respectively.

Soundness. It is assumed that the prover does not know P but, by condition, can compute $P' = [\hat{\Gamma}]G_1$ for some $z \in X$ and first send the witness $P1 = [v]P' = [v\hat{\Gamma} \pmod m]G_1$ and then $g_1 = e_m([v+z \pmod m]P', P2) = g^{\phi(v\hat{\Gamma}+\Gamma) \pmod m}$. But $P' \neq [\beta\hat{\Gamma}]G_1$ and $e_m(P1, P2)\tilde{g}^{\phi} = g^{\phi(v\hat{\Gamma}+\beta\Gamma) \pmod m} \neq g_1$. Since only the one who knows the secret P can prove the fact of owning z, while Pr (guessing $\beta$) = $m^{-1}$ with m~$2^{160}$, then $\forall(P' \neq P) \wedge (v, \phi \in_R(0, m-1])$, $\tilde{g}^{\phi}g_2 \neq g_1$.

Zero-Knowledge. The prover knows the secret P and some z, while the verifier has access to $\tilde{g}$ whose authenticity and integrity has been confirmed as a result of verifying the DS. Then, provided the verifier and the prover are honest, information about z and P is not disclosed, since v, $\phi \in_R(0, m-1]$. Other scenarios are also possible.

Honest prover and dishonest verifier. The verifier seeks to disclose z, P and, to this end, chooses so that distribution thereof differs from a uniform one. For example, he/she can use $\phi$=const in each session. But disclosure does not occur, since P1 and $g_1$ have a uniform distribution due to v.

Honest verifier and dishonest prover. It is assumed that the prover knows z, P and seeks to disclose them. Such a scenario is of minor practical value, since the prover can always disclose them without relying on Protocol 7.1. If the prover does not know z, P, but seeks to disclose them, then all the possible attempts eventually come to disclosure of the secret $\beta$.

Dishonest prover and dishonest verifier. If z, P need to be disclosed, this scenario is of no sense, since the prover can disclose z, P himself/herself, without participation of the verifier (see the previous scenario).

8. COMMENTS REGARDING THE SET X

The reasoning of Section 7 is based on the assumption that the set X is publicly available. Since the trusted party T secretly sends $\{x_i, P_i\}$ to the i-th participant, then disclosure of X contradicts common sense and has no practical reasons. The only purpose of this assumption is to demonstrate cryptographic security of Protocol 7.1 with the known X. Section 7 shows that this assumption does not affect cryptographic security, and if P is unknown, then $CDH_g(\cdot,\cdot)$ or the ECDLP must be solved in order to prove the fact of owning some z. However, a side effect exists in this case—the i-th participant is able to prove the fact of owning not only $x_i$ that he/she has received from T in the registration stage, but also any other $z \in X$. It is clear that this effect disappears if the set X is not published, because the i-th participant will not be able to compute $P_j \neq P_i$ such that $P_j = [\beta\hat{\Gamma}_j \pmod m]G_1$ with known $\{x_i, P_i\}$ and unknown $x_j \neq x_i$. It should be recalled herein that, in order to compute $x_i$, it is necessary to know the secret $\beta$. Moreover, if $\{x_i, P_i\}$ are disclosed, for example as a result of a leak, then the intruder is able to prove only the fact of owning $x_i$, but is not able to do it for other $x_j$, such that $j \neq i$, $1 \leq i$, $j \leq n$.

Statement 8.1. Given the known secret $\{x_i, P_i = [\hat{\Gamma}_i \pmod m]G_1\}$ and unknown X, in addition to proving the fact of owning $x_i$, the fact of owning z=1 can also be proven. This possibility does not contradict the basic principle: only the one can prove membership in the community who owns a respective personal secret which has not been disclosed in the course of the proving.

$P' = [x_i]P_i = [\beta\Gamma \pmod m]G_1$ is computed. Then $P1 = [zv \pmod m]P' = [zv\beta\Gamma \pmod m]G_1$ and $g_1 = e_m([v+z \pmod m]P', P2) = g^{\phi\beta\Gamma(v+z)(mod\ m)}$. Since $\tilde{g}^{\phi}g_2 = g^{\phi\beta\Gamma(1+zv)\ (mod\ m)}$, then for all $1 < z \leq (m-1)$.

Comment 4. It makes sense to consider z=1 as a selected element of the set X with a special property which is that the i-th participant who knows the secret $\{x_i, P_i\}$ can prove the fact of owning this element along with $x_i$.

It is assumed that the local community changes over time: some members are excluded from it, and others, on the contrary, are included. Such dynamics leads to change of the set X. The description of how this affects Protocol 7.1 is given hereinbelow.

Exclusion of existing members. Let there is a set X and an $\ell$-the member is excluded, $x_\ell \in X$. In such a case, T computes and then publishes a public group key $\tilde{g} = e_m([\beta\Gamma' \pmod m]G_1, G_1)$, where $\Gamma' = x_\ell^{-1}\Gamma \pmod m$. As a result, $X' = X \setminus x_\ell$ and $|X'| = n-1$. According to the procedure, each member must be given his/her personal secret pair $\{x_i, P_i = [\beta\hat{\Gamma}_i \pmod m]G_1\}$, where $\hat{\Gamma}_i = x_i^{-1}\Gamma' \pmod m$, $x_i \in X'$, $i = \overline{1,(n-1)}$. It should be obvious that the $\ell$-th member does not receive an updated personal secret pair, but he/she still has a secret pair $\{x_\ell, P_\ell = [\beta\hat{\Gamma}_\ell \pmod m]G_1\}$. It should be noted that, by construction, $\hat{\Gamma}_\ell = x_\ell^{-1}\Gamma \pmod m = \Gamma'$. Then it follows from Statement 8.1 that the excluded $\ell$-th member is able to exhibit membership in the community by proving the fact of owning z=1.

If more than one member is excluded, e.g. $\ell_1$-th and $\ell_2$-th, $\ell_1 \neq \ell_2$, then $\Gamma' = x_{\ell_1}^{-1}x_{\ell_2}^{-1}\Gamma \pmod m$. If the possibility of conspiracy between the excluded members is assumed, then it would be reasonable to suppose that the $\ell_1$-th member knows $x_{\ell_2}$, while the $\ell_2$-th member knows $x_{\ell_1}$. Initially, the $\ell_1$-th member has a secret pair $\{x_{\ell_1}, P_{\ell_1} = [\beta\hat{\Gamma}_{\ell_1} \pmod m]G_1\}$, where $\hat{\Gamma}_{\ell_1} = x_{\ell_1}^{-1}\Gamma \pmod m$. Therefore, $\Gamma' = x_{\ell_2}^{-1}\hat{\Gamma}_{\ell_1} \pmod m$, and the $\ell_1$-th member can prove membership in the community by proving the fact of owning z=1. Similar arguments are true for the $\ell_2$-th member. Therefore, there is a common problem when excluding both an individual member and a non-empty subset of members. The combination of exclusion operations will be referred to hereinafter as the exclusion cycle.

An obvious solution can be used. The trusted party T chooses such a long-term secret $\beta' \in_R(0, m-1]$ that $\beta' \neq \beta$, and publishes $\tilde{g} = g^{\beta'\Gamma'(mod\ m)}$. All the members except for excluded ones receive a personal secret pair $\{x_i, P_i = [\beta'\hat{\Gamma}_i \pmod m]G_1\}$. As a result, an excluded member will be unable to prove membership in the community, since $\tilde{g}^{\phi}g_2 = g^{\phi\Gamma'(\beta'+\beta zv)\ (mod\ m)}$ and if $g_1 = g^{\phi\beta\Gamma'(v+z)\ (mod\ m)}$, then $\tilde{g}^{\phi}g_2 \neq g_1$ for all $0 < z \leq (m-1)$.

Despite the replacement of β, elements of the set X' are not computed again. Therefore, β must be saved in order to verify that a certain identifier $a_i \in \Omega^*$ is a prototype of $x_i = h(a_i \| h^i(\beta))$, $i \in [1, n-1]$. In Explanation 1 it is noted that, in order to disclose β which is known only to T, the problem of exponential/subexponential complexity is to be solved. Then the level of cryptographic security does not decrease if we assume that $\beta' = h(\beta)$, where $h(\cdot)$ is the cryptographic hash function. Generally, $\beta_t' = h^t(\beta)$, where t is a sequence number of the exclusion cycle. For example, $\beta_1' = h(\beta)$. $\beta_2' = h(h(\beta))$, $\beta_3' h(h(h(\beta)))$ and so on. It is further ensured thereby that $\beta \neq \beta_1' \neq \beta_2' \neq \beta_3' \neq \ldots$. It should be noticed that in the t-th exclusion cycle it is necessary to access $h(\cdot)$ t times to compute $\beta_t'$, β and $\beta_{t-1}'$, $t>1$ should be saved in memory after successful completion of the (t−1)-th cycle so that the amount of computations is reduced. Then in the next t-th cycle $\beta_t' = h(\beta_{t-1}')$, and, after updating the group key and the personal secrets, $\beta_t'$ is saved in memory instead of $\beta_{t-1}'$. As a result, we have a single access to $h(\cdot)$, and $2\lceil \lg m \rceil$ bits of long-term memory should be reserved for data storage.

Inclusion of new members. Let there is a set X and such a (n+1)-th member is included) that $x_{n+1} = h(a_{n+1} \| h^{n+1}(\beta))$. Then $X' = X \cup x_{n+1}$, $|X'| = n+1$, $\Gamma' = x_{n+1}\Gamma \pmod{m}$. The trusted party T publishes $\tilde{g} = g^{\beta \Gamma' \pmod{m}}$ and transmits an updated personal secret pair $\{x_i, P_i = [\beta \hat{\Gamma}_i \pmod{m}] G_1\}$ to each member, where $\hat{\Gamma}_i = x_i^{-1}\Gamma' \pmod{m}$, $x_i \in X'$, $i = \overline{1,(n+1)}$. It should be noted that $\hat{\Gamma}_{n+1} = x_{n+1}^{-1}\Gamma' \pmod{m} = \Gamma$. As a consequence, an i-th member, $1 \leq i \leq n$, besides the updated secret pair, also has the "previous" personal secret pair $\{x_i, P_i' = [\beta \hat{\Gamma}_i \pmod{m}] G_1\}$, where $\hat{\Gamma}_i = x_i^{-1}\Gamma \pmod{m}$. Let $P' = [x_i]P_i' = [\beta \Gamma \pmod{m}]G_1$. Then $P1 = [zv \pmod{m}]P' = [zv\beta\Gamma \pmod{m}]G_1$ and $g_1 = g^{\phi \beta \Gamma (v+z) \pmod{m}}$, however, since $\tilde{g}^{\phi} g_2 = g^{\phi \beta (\Gamma' + \Gamma zv) \pmod{m}}$, then $\tilde{g}^{\phi} g_2 \neq g_1$ for all $0 < z \leq (m-1)$. It means that the i-th member cannot use the "previous" personal secret pair to prove the fact of owning $z=1$ or $x_i$.

The presented arguments are fair for inclusion of $\eta > 1$ members, when $X' = X \cup_{j=1}^{\eta} x_{n+j}$, $|X'| = n+\eta$ and $\Gamma' = \Pi_{j=1}^{\eta} x_{n+j} \Gamma \pmod{m}$ Thus, inclusion/exclusion causes updating the group public key, as well as members' personal secrets. The difference is that in the t-th exclusion cycle, when computing personal secrets and the group key, the previously used long-term secret β should be denied and $\beta_t' = h^t(\beta)$ should be used instead, while the inclusion process does not require such action.

9. ILLUSTRATIVE EMBODIMENTS

9.1. Illustrative Computing Environment

Figure 2:
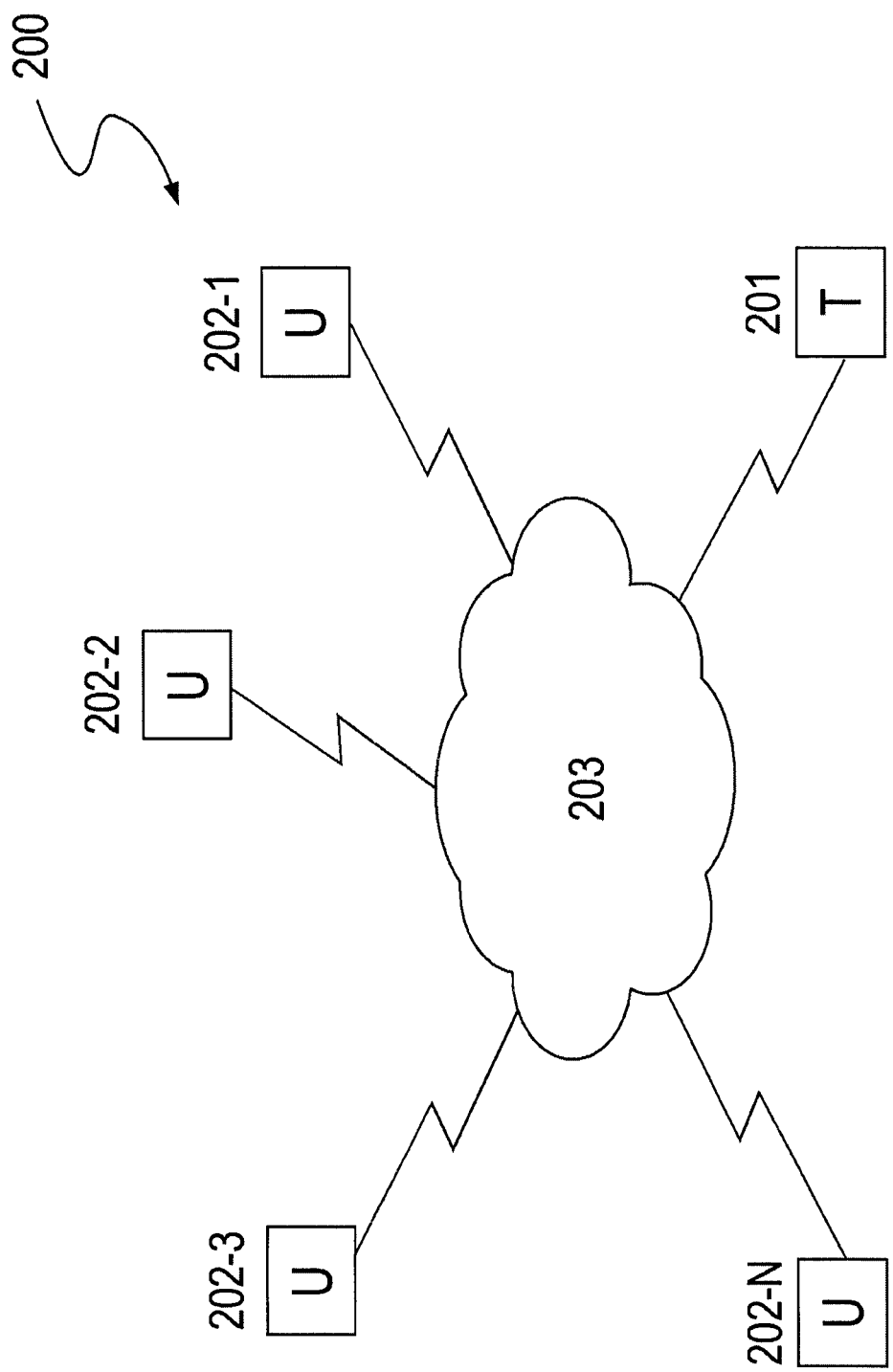
FIG. 2 is the schematic illustration of an embodiment of a computing system where the present invention is implemented.

With reference to FIG. 2, the exemplary embodiment of a computing system 200 in which the present invention is implemented is described below.

The computing system 200 comprises at least one computing device 201 of the trusted party and a plurality of user computing devices 202-1, 202-2, 202-3, . . . , 202-N which may be commonly referred to hereinafter as 202. Such broadly known devices as personal computer (PC), laptop, tablet, smartphone, etc. can be used as the computing devices 201, 202. The computing system 200 typically includes other components as well (various storages/databases, etc.). Components of the computing system 200 are interconnected via at least one communication network and/or environment which is commonly denoted as 203 in FIG. 2. Broadly known wired and/or wireless communication networks (including publicly available ones), through which the components of the computing system 200 interact with each other and with other devices/networks using appropriate broadly known network and communication technologies, can be used as the communication network(s) employed herein. In particular, implementations of the computing system 200 are possible where devices, such as 201, 202, can interact directly with each other using such technologies as NFC.

The computing devices, such as 201, 202, used to implement the proposed technology, include well-known hardware, such as processors, memory units, input/output devices, mass storage devices, communication means (for example, communication interfaces), etc., and basic software, such as operating systems, protocol stacks, drivers, etc., which may be commercially available or custom. Furthermore, the approach described herein is preferably implemented by designing special software using known programming technologies and environments and by deploying and running it on the respective components of the proposed computing system 200.

9.2. Exemplary Methods in Accordance with the Present Invention

Figure 3:
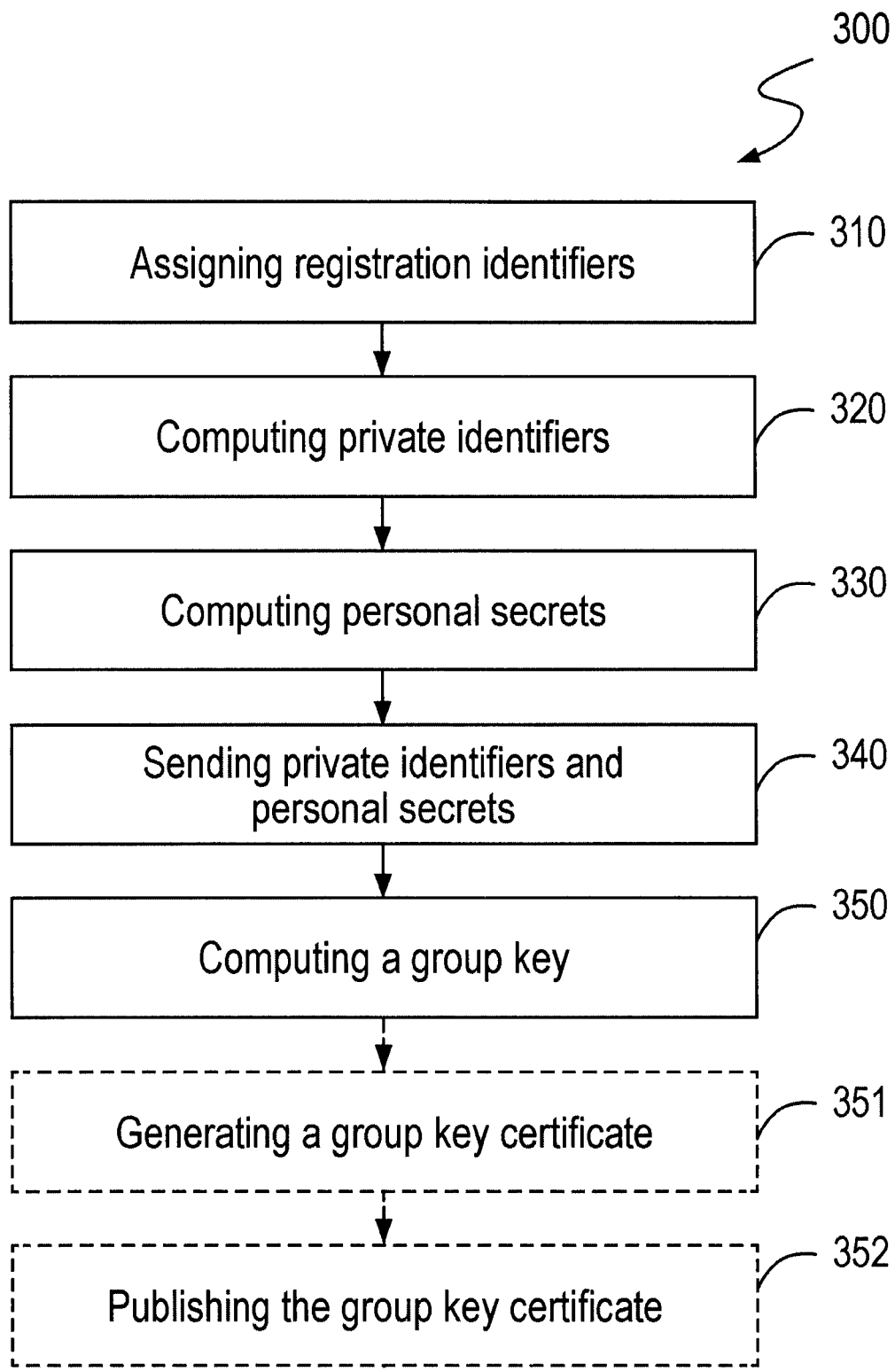
FIG. 3 is the flowchart illustrating the preliminary stage of the anonymous identification method in accordance with the present invention.

The exemplary embodiment of the method of anonymously identifying a user as a member of a group of users in accordance with the present invention is described below with reference to FIGS. 3, 4. It is assumed that the embodiment of the method according to the present invention described hereinbelow is implemented in the computing system 200.

The anonymous identification method includes a preliminary stage 300 described below with reference to FIG. 3, and an identification session 400 described below with reference to FIG. 4.

The preliminary stage 300 is implemented in the computing device 201 of the trusted party T with respect to the group of n users.

In step 310, each j-th user, $1 \leq j \leq n$, is registered by assigning to him/her a registration identifier $a_j$ which corresponds to the j-th user. In according with the aforesaid, $a_j$, in general, represents a sequence of symbols and, in particular, may include name, registration number, personal insurance policy number, and/or other known character identifier(s) of the j-th user.

In step 320, for each i-th user, $1 \leq i \leq n$, a unique private identifier $x_i$ is computed based on $a_i$. According to the preferred embodiment, $x_i$ is computed as $x_i = h(a_i \| h^i(\beta))$, where, as noted above, $h(\cdot)$ is the λ-bit cryptographic hash function, $h^i(\cdot)$ denotes i-fold iterative hashing, $\cdot \|\cdot$ denotes concatenation. Accordingly, each of the computed private identifiers has the same number of digits λ. Any suitable known hash function with the required number of digits, for example, the one generated by the algorithm from FIPS PUB 180-4, may serve as $h(\cdot)$. The recommendations according to [1] define that $60 \leq \lambda > 512$, then implementation of h(x) first requires to apply $y = SHA_{512}(x)$, and then to use values λ of less significant digits of y as the output of the function h(x). Here, $SHA_{512}(\cdot)$ is a standard cryptographic hash function from FIPS PUB 180-4.

As discussed previously, the obtained set $X = \{x_1, \ldots, x_n\}$, $i = \overline{1,n}$ can be published by the trusted party T by using any of the known digital publication methods.

It should be noticed at this point that this preferred embodiment of computing unique private identifiers is not the only possible one, and other known techniques may be used to compute private identifiers of users, without the possibility of reconstructing any personal information of a user from a corresponding private identifier. Moreover, not only registration character identifiers of users can be used as a basis to compute their private identifiers: for instance, a vector of values of digitized bio-identification information (e.g. facial features) of a user may be used to this end.

In step 330, for each i-th user, $1 \leq i \leq n$, his/her personal secret is computed as $P_i = [\beta \hat{\Gamma}_i \pmod{m}] G_1$, where, in accordance with the aforesaid, $\hat{\Gamma}_i = x_i^{-1} \Gamma \pmod{m}$, $\Gamma = \Pi_{i=1}^{n} x_i \pmod{m}$, $\beta$ is the secret available only to the trusted party, $G_1$ is the generator of the subgroup $\mathbb{G}$ of the prime order m of the additive group of points $E(\mathbb{F}_p)$ on the elliptic curve $E/\mathbb{F}_p$ over the finite field $\mathbb{F}_p$, $p > 3$ is an odd prime, [·] denotes scalar product.

In step 340, the computing device 201 of the trusted party transmits, to the computing device 202 of each i-th user, $1 \leq i \leq n$, a pair including his/her private identifier $x_i$ and personal secret $P_i$ computed is steps 320 and 330, respectively.

In step 350, the public group key for the group is computed as $\tilde{g} = e_m([\beta \Gamma \pmod{m}] G_1, G_1)$. As noted before, $e_m(\cdot, \cdot)$ is symmetric pairing which represents mapping $\mathbb{G}_1 \times \mathbb{G}_1 \mapsto \mathbb{G}_3$, where $\mathbb{G}_3$ is the subgroup of the prime order m of the multiplicative group of the extended finite field $\mathbb{F}_{p^k}^*$ with the generator g with the embedding degree $k>1$. Moreover, P, m, $\mathbb{G}_1$, $\mathbb{G}_3$, $e_m(\cdot, \cdot)$ are preferably preset in the computing device 201 of the trusted party and are publicly available; the secret β is preset in the computing device 201 of the trusted party so that $\beta \in_R (0, m-1]$, $2^{\lambda-1} < m < 2^\lambda$ where n<m.

The computed group key $\tilde{g}$ can be placed into some public data storage. This public data storage may have a known implementation and may either be part of the computing system 200 or be external with respect thereto (such as a cloud storage).

According to the preferred embodiment, step 350 includes substep 351, wherein a certificate $\{\mathcal{D}_T, \tilde{g}, \mathfrak{S}\}$ of the public group key $\tilde{g}$ is issued, where $\mathcal{D}_T$ is information regarding the trusted party T, $\mathfrak{S}$ is a DS of this certificate. The DS of the public group key is computed as $\mathfrak{S} \leftarrow \text{Sign}(\mathcal{H}(\tilde{g} \| \mathcal{D}_T), \mathcal{S})$, where, in accordance with the aforesaid, Sign (·,·) is the function for generating the DS, $\mathcal{S}$ is the secret key of the trusted party T, $\mathcal{H}(\cdot)$ is the cryptographic hash function. The information $\mathcal{D}_T$ regarding the trusted party may include some unique identifiers, references to resources, etc., and, in general, corresponds to information which is typically included in a public key certificate to unambiguously identify its owner (see e.g. the X.509 standard). It should be noted here that any known hash function with the required number of digits can be employed as the cryptographic hash function $\mathcal{H}(\cdot)$ used to generate the DS, but in general it should not be identical to the cryptographic hash function h(·) used to compute the unique private user identifiers (see step 320). More particularly, the hash function $\mathcal{H}(\cdot)$ is defined by the method of generating/verifying the DS. For example, a hash function with a suitable number of digits from FIPS 202 (SHA-3, Keccak) can be used.

Then, in substep 352, the issued certificate $\{\mathcal{D}_T, \tilde{g}, \mathfrak{S}\}$ is deposited in the public data storage.

As discussed above, if at least one new user is added to the considered group, then, in accordance with the method according to the present invention, steps 310, 320 of the preliminary stage 300 are additionally performed with respect to this at least one new user, and steps 330-350 of the preliminary stage 300 are repeated with respect to the entire extended user group whereto the at least one new user has been added. With each exclusion of at least one user from the considered group of users, when performing the preliminary stage 300 in the computing device 201 of the trusted party, a new secret β' is selected such that β' is not equal to the previously used secret, thereafter steps 330-350 of the preliminary stage are repeated with respect to the entire reduced user group wherefrom this at least one user has been excluded. As noted before, it may be assumed in general that $\beta_t' = h^t(\beta)$, where t is a sequence number of the exclusion cycle: for example, $\beta_1' = h(\beta)$, $\beta_2' = h(h(\beta))$, $\beta_3' = h(h(h(\beta)))$ and so on. It is ensured thereby that $\beta \neq \beta_1' \neq \beta_2' \neq \beta_3' \neq \ldots$ .

Figure 4:
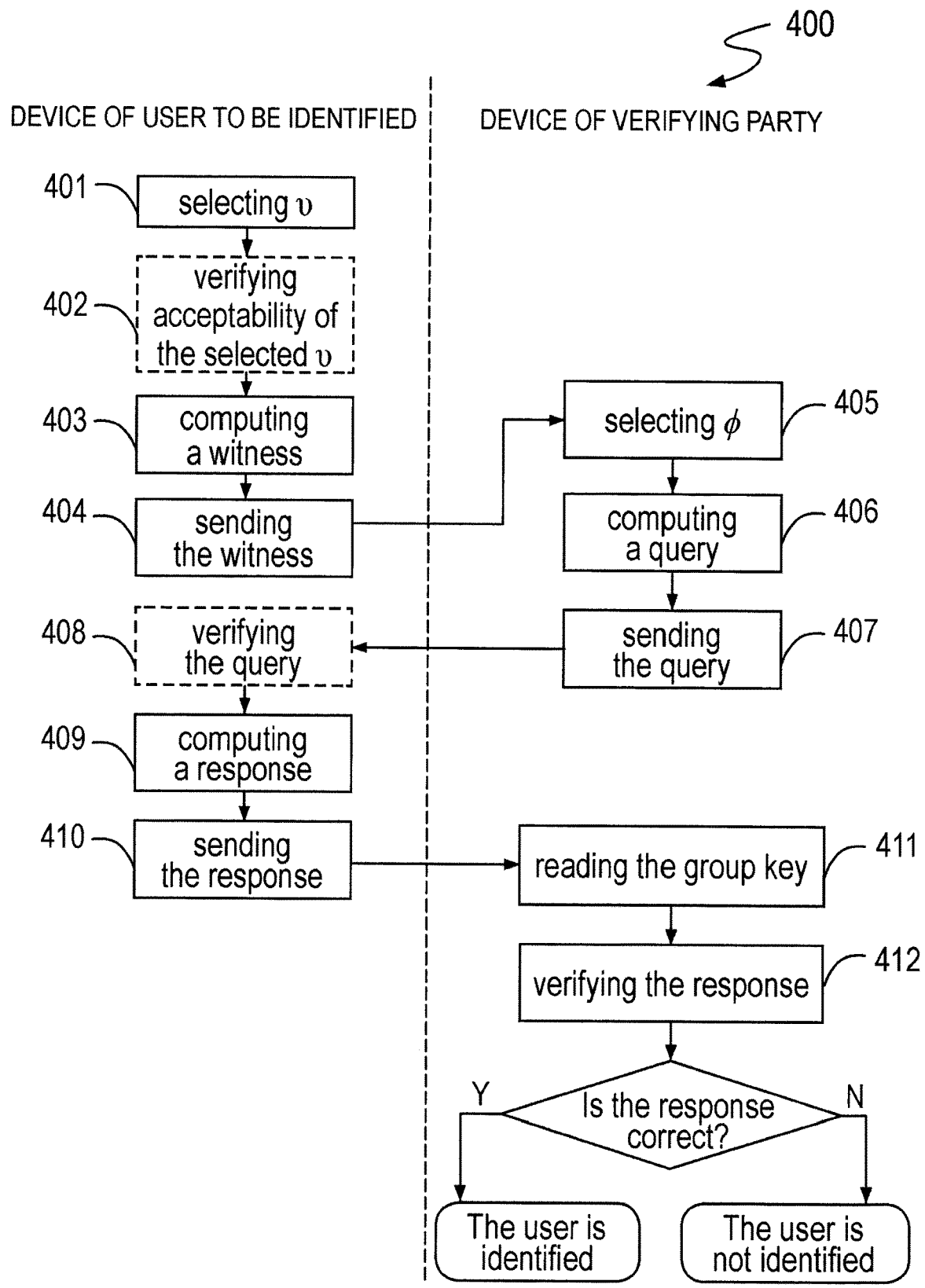
FIG. 4 is the flowchart illustrating the identification session in accordance with the present invention.

The discussion of the preliminary stage 300 is now finished, and transition is made to the discussion of the identification session 400 with reference to FIG. 4.

In step 401 of the identification session 400, a random number $v \in_R (0, m-1]$ is selected in a computing device of a user U to be identified (for example, the computing device 202-1), said random number being ephemeral for each identification session.

The method 400 preferably includes step 402 of performing, in the computing device 202-1, verification of whether the following condition $([v]P \neq \infty) \wedge ([v+z \pmod{m}]P \neq \infty)$ is met with respect to the selected v, and if this condition is not met, a new v is chosen.

In step 403, a witness is computed as P1[v]P in the computing device 202-1, where P is a personal secret of the user to be identified.

In step 404, a first message containing the computed witness Pi is sent from the computing device 202-1 to a computing device of a verifying party (for example, the computing device 202-N).

Then, in the computing device 202-N: in step 405, a secret random number $\phi \in_R (0, m-1]$ which is ephemeral for each identification session is selected; and, in step 406, a query is computed as $P2 = [\phi] G_1$.

In step 407, a second message containing the computed query P2 is sent from the computing device 202-N to the computing device 202-1.

The method 400 preferably includes step 408 of performing, in the computing device 202-1, verification of whether the following is true with respect to the query that was received from the computing device 202-N: P2≠∞; wherein if P2=∞, the identification session 400 is terminated.

In step 409, a response is computed as $g_1 = e_m([v+z \pmod{m}]P, P2)$ in the computing device 202-1, where z is a private identifier of the user U, and, in step 410, a third message containing the computed response $g_1$ is sent from the computing device 202-1 to the computing device 202-N.

The method 400 includes step 411 which is performed in the computing device 202-N and comprises obtaining the public group key. According to the specific implementation of step 411, the certificate $\{\mathcal{D}_T, \tilde{g}, \mathfrak{S}\}$ of the public group key is read from the public data storage, and verification of the DS of this certificate is carried out. Moreover, the DS of the public group key certificate is verified with $\mathfrak{B} \leftarrow \text{Verify}(\mathcal{H}(\tilde{g} \| \mathcal{D}_T), \mathfrak{S}, \mathcal{P})$, where, according to the aforesaid, Verify(·, ·, ·) is the function of verifying the DS, the value of $\mathfrak{B}$ is True when the DS is valid or False otherwise, $\mathcal{P}$ is the public key of the trusted party T, said public key being paired to $\mathcal{S}$.

It should be noticed at this point that the above mentioned functions Sign (·,·) and Verify(·,·,·) generally correspond to the algorithm for generating and verifying the DS $\mathfrak{S}$, respectively.

In step 412 performed in the computing device 202-N, if ($\mathcal{B}$ =True) $\wedge$ (P1≠∞) then the response $g_1$ received from the computing device 202-1 is checked for equality to the verification factor computed as $\tilde{g}^{\Phi}g_2$, where $g_2=e_m$(P1, P2). The user U is identified as a member of the group of the identification session 400 only if the response $g_1$ is equal to the computed verification factor.

10. MEMORY AMOUNT, TRANSMISSION OVERHEAD, COMPUTATIONAL COMPLEXITY

1. Practical requirements for cryptographic security are such that ⌈lg m⌉≥160(see recommendations of the European Union Agency for Network and Information Security).
2. For the purpose of efficient implementation of arithmetic, ⌈lg m⌉<⌈lg p⌉≤256.
3. If |X|=n and ⌈lg m⌉=λ, then ⌈lg p⌉<nλ with n≥2.
4. The selected P and m are fixed, do not depend on n, and are interpreted as long-term parameters which are replaced only as a result of adjusting the requirements for cryptographic security.

10.1. Memory Amount k⌈lg p⌉ bits are required to store $\tilde{g}$ in a long-term public storage. Each member will need ⌈lg p⌉+1 bits in a local long-term storage to store $P_i$ in the case of the compact curve point representation (see Section 5) and ⌈lg m⌉ bits to store $x_i$.

Since memory consumption does not depend on n, then the asymptotic estimate of the amount of long-term public storage is O(1).

10.2. Transmission Overhead

If the compact curve point representation is used, then ⌈lg p⌉(k+2)+2 bits in total are required to deliver P1, P2, and $g_1$. The transmission overhead can be reduced if c=h($g_1$) is used instead of $g_1$, where h:$\{0,1\}^* \mapsto \{0,1\}^{\lceil lg\ m \rceil}$ is a cryptographic hash function (obviously, this increases cryptographic security, since the possibility of any transformations of $g_1$ is eliminated). Then verification is performed according to the rule: h($\tilde{g}^{\Phi}g_2$) $\stackrel{?}{=}$ c. In total 2(⌈lg p⌉+1)+⌈lg m⌉ bits will be transmitted.

If the compact curve point representation is not used, then, in total, 4⌈lg p⌉+⌈lg m⌉ are transmitted and, in the case of $g_1$, ⌈lg p⌉(k+4) bits are transmitted.

10.3. Computational Complexity

The prover computes the sum modulo ni, two scalar products, and one pairing. The verifier computes scalar product, pairing, discrete exponentiation, and product in $\mathbb{G}_3$. If c is sent instead of $g_1$, then both the prover and the verifier additionally compute the value of the hash function h(·). If the compact curve point representation is used, then the square root in $\mathbb{F}_p$ is to be computed using the Tonelli-Shanks algorithm of asymptotic complexity O(lg$^2$p). The verifier does it for P1, while the prover does it for P2. The actions to be performed are summarized in Table 1.

TABLE 1

| | Computational complexity | | | | |
|---|---|---|---|---|---|
| | $\mathbb{F}_m^+$ | $\mathbb{G}_3$ | $\mathbb{G}_1$ | em (·, ·) | $\hbar$ (·) | Tonelli-Shanks |
| Prover | 1 | — | 2 | 1 | 1 | O(lg$^2$p) |
| Verifier | — | 2 | 1 | 1 | 1 | O(lg$^2$p) |

Since computational complexity does not depend on n, then its asymptotic estimate is O(1).

11. CONCLUSION

One-way quasi-commutative functions over elliptic curves are applied to build one-way accumulators which are used in the witness hiding protocol in order to verify membership in a local community of registered members. Since complexity of the verification and the amount of publicly available memory to store public information do not depend on the number of participants, then the asymptotic estimate of complexity of the verification and reserved memory amount is O(1). Examples of software implementation of various types of pairing can be found in the PBC Library at the Stanford University website.

It should be appreciated that the described embodiments are just preferable but not the only possible examples of the present invention. On the contrary, the scope of the invention is defined by the following claims and their equivalents.

12. BIBLIOGRAPHY

[1] Benaloh, Josh C. and de Mare, M. "One-Way Accumulators: A Decentralized Alternative to Digital Signatures (Extended Abstract)." Advances in Cryptology EUROCRYPT'93, Workshop on the Theory and Application of Cryptographic Techniques, Lofthus, Norway, May 23-27, 1993,274-285.

[2] Naor, M. and Yung, M. "Universal One-way Hash Functions and their Cryptographic Applications."Proc. 21st ACM Symp. on Theory of Computation, Seattle, Wash. (May 1989), 33-43.

[3] Rompel, J. "One-way Functions are Necessary and Sufficient for Secure Signatures."Proc. 22nd ACM Symp. on Theory of Computation, Baltimore, Md. (May 1990).

[4] Impagliazso, R., Levin, L. and Luby, M. "Pseudorandom Generation from One-way Functions." Proc. 21st ACM Symp. on Theory of Computation, Seattle, Wash. (May 1989), 12-24.

[5] Merkle, R. "Protocols for Public Key Cryptosystems." Proc. 1980 Symp. on Security and Privacy, IEEE Computer Society (April 1980), 122-133.

[6] Cohen, H., Frey, G., Roberto Avanzi, R., Doche C., Lange, T., Nguyen, K. and Vercauteren, F. Handbook of Elliptic and Hyperelliptic Curve Cryptography, Chapman and Hall/CRC, 2006.

[7] Verheul, E. "Evidence that XTR Is More Secure than Supersingular Elliptic Curve Cryptosystems." Advances in Cryptology Eurocrypt 2001, LNCS 2045, Springer-Verlag (2001), 195-210.

[8] Silverman, J. H. The Arithmetic of Elliptic Curves, Springer-Verlag, New York, 1986.

[9] Frey, G. and Ruck, H. G. "A remark concerning the m-divisibility and the discrete logarithm in the divisor class group of curves." Mathematics of Computation, 62 No.206 (1994), 865-874.

[10] Frey, G., Muller, M. and Rück, H. G. "The Tate Pairing and the Discrete Logarithm Applied to Elliptic Curve Cryptosystems." IEEE Transactions on Information Theory 45(5) (1999), 1717-1719.

[11] Baretto, P. S. L. M., Kim, H. Y., Lynn, B. and Scott, M. "Efficient Algorithms for Pairing-Based Cryptosystems." Advances in Cryptology Crypto 2002, LNCS 2442, Springer-Verlag (2002), 354-368.

[12] Menezes, A., Okamoto, T., and Vanstone, S. "Reducing Elliptic Curve Logarithms to Logarithms in a Finite Field." IEEE Trans. Information Theory, 39(5) (1993), 1639-1646.

[13] Menezes, A. J. Elliptic Curve Public Key Cryptosystems, Kluwer International Series in Engineering and Computer Science, 1993.

[14] Miyaji, A., Nakabayashi, M., and Takano, S. "New Explicit Conditions of Elliptic Curve Traces for FR-Reduction." IEICE Trans. Fundamentals, Vol. E84 A, no. 5, May 2001.

[15] Hankerson, D., Menezes, A. and Vanstone, S. Guide to Elliptic Curve Cryptography, Springer-Verlag, 2004.

[16] Menezes, A., van Oorschot, P. and Vanstone, S. Handbook of Applied Cryptography, CRC-Press, 1996.

[17] Odlyzko, A. "Discrete Logarithms: The Past and the Future." Designs, Codes, and Cryptography, Vol. 19, No. 2-3, 2000, 129-145.

[18] Jacobsen Jr., M. J., Koblitz, N., Silverman, J. H., Stein, A. and Teske, E. "Analysis of the Xedni calculus attack." Designs, Codes and Cryptography, Vol 20 (2000) 41-64.

[19] Silverman, J. H. "The Xedni calculus and the elliptic curve discrete logarithm problem." Designs, Codes and Cryptography, Vol. 20 (2000) 5-40.

[20] Atkin, A. and Morain, F. "Elliptic Curves and Primality Proving." Math. Comput., 61(203) (1993) 29-68.

[21] Morain, F. "Building cyclic elliptic curves modulo large primes." In Advances in Cryptology—EUROCRYPT' 9 1 (Brighton, 1991), volume 547 of Lecture Notes in Comput. Sci., Springer, Berlin, 328-336.

[22] Brezing, F. and Weng, A. "Elliptic Curves Suitable for Pairing Based Cryptography." Des. Codes Cryptogr., 37(1) (2005) 133-141.

[23] Dupont, R., Enge, A. and Morain, F. "Building Curves with Arbitrary Small MOV Degree Over Finite Prime Fields." J. Cryptol., 18(2) (2005) 79-89.

[24] Freeman, D. "Constructing Pairing-Friendly Elliptic Curves With Embedding Degree 10." In Algorithmic number theory, vol. 4076 of Lecture Notes in Comput. Sci., Springer, Berlin, (2006), 452-465.

[25] Galbraith, S. D., Harrison, K. and Soldera, D. "Implementing the Tate pairing." Algorithm Number Theory Symposium ANTS V, Lecture Notes in Comput. Sci., vol. 2369, Springer-Verlag, (2002), 324-337.

[26] Satoh, T. and Araki, K. "Fermat Quotients and the Polynomial Time Discrete Log Algorithm for Anomalous Elliptic Curves." Comm. Math. Univ. Sancti Pauli, 47 (1998), 81-92.

[27] Smart, N. P. "The Discrete Logarithm Problem on Elliptic Curves of Trace One." Journal of Cryptology, Vol. 12, No. 3, (1999), 193-196.

[28] Semaev, I. A. "Evaluation of Discrete Logarithms in a Group of p-Torsion Points of an Elliptic Curve in Characteristic p." Math. of Comput., 67 (1998), 353-356.

[29] Okamoto, T. and Pointcheval, D. "The Gap-Problems: A New Class of Problems for the Security of Cryptographic Schemes." Practice and Theory in Public Key Cryptography PKC 2001, LNCS 1992, Springer-Verlag (2001), 104-118.

[30] Maurer, U. M. "Towards the Equivalence of Breaking the Diffie-Hellman Protocol and Computing Discrete Logarithms." Advances in Cryptology Crypto'94, LNCS 839, Springer-Verlag (1994), 271-281.

[31] Maurer, U. M. and Wolf, S. "The Relationship between Breaking the Diffie-Hellman Protocol and Computing Discrete Logarithms." Advances in Cryptology Crypto'96, LNCS 1109, Springer-Verlag (1999), 268-282.

[32] Boneh, D., Shacham, H. and Lynn B. "Short Signatures from the Weil Pairing," J. Cryptol., Vol. 17, No. 4, (2004), 297-319.

[33] Chaum, D. "Zero-Knowledge Undeniable Signatures." Advances of Cryptology Eurocrypt'90, LNCS 473, Springer-Verlag (1991), 458-464.

[34] De Santis, A., Micali, S. and Persiano, G. "Non-Interactive Zero-Knowledge Proof Systems."

Advances in Cryptology CRYPTO'87 Proceedings, Springer-Verlag, (1988) 52-72.

[35] Goldwasser, S., Micali, S. and Rackoff, C. "The knowledge complexity of interactive proof systems." SIAM J. Comput., Vol. 18, Iss. 1, (1989) 186-208.

[36] Fiat, A. and Shamir, A. "How to prove yourself: Practical solutions to identification and signature problems." Advances in Cryptology CRYPTO'86 (LNCS 263), (1987) 186-194.

[37] Feige, U., Fiat A. and Shamir, A. "Zero-knowledge proofs of identity." Journal of Cryptology, 1 (1988) 77-94.

[38] Guillou, L.C. and Quisquater, J.-J. "A practical zero-knowledge protocol fitted to security microprocessor minimizing both transmission and memory." Advances in Cryptology EUROCRYPT'88 (LNCS 330), (1988) 123-128.

[39] Schnorr, C. P. "Efficient identification and signatures for smart cards." Advances in Cryptology CRYPTO'89 (LNCS 435), (1990) 239-252.

[40] Schnorr, C. P. "Efficient signature generation by smart cards." Journal of Cryptology, 4 (3), (1991) 161-174.

[41] Brickell, E. F. and Mccurley, K. S. "An interactive identification scheme based on discrete logarithms and factoring." Journal of Cryptology, 5 (1992) 29-39.

[42] Okamoto, T. "Provably secure and practical identification schemes and corresponding signature schemes." Advances in Cryptology CRYPTO' 92 (LNCS 740), (1993) 31-53.

[43] Feige, U. and Shamir, A. "Witness Indistinguishable and Witness Hiding Protocols." In Proceedings of 22nd STOC, ACM Press, (1990) 416-426.

[44] Cramer, R. "Modular Design of Secure, yet Practical Cryptographic Protocols." PhD Thesis, University of Amsterdam, 1996.

[45] Cramer, R. and Damgard, I. B. "Fast and Secure Immunization against Man-in-the-Middle Impersonations." Advances in Cryptology EUROCRYPT' 97, International Conference on the Theory and Application of Cryptographic Techniques, Konstanz, Germany, May 11-15, Proceedings. ed. Walter Fumy, Springer, (1997) 75-87.

[46] Bengio, S., Brassard, G., Desmedt, Y., Goutier C., Quisquater, J. J. "Secure Implementation of Identification Systems." Journal of Cryptology, (4), (1991) 175-183.

[47] Desmedt, Y., Goutier C., Bengio, S. "Special uses and abuses of Fiat-Shamir passport protocol." In C. Pomerance, editor, Advances in Cryptology, Proc. of Crypto'87 (LNCS 293), (1988) 21-39.

[48] Babai, L. and Moran, S. "Arthur-Merlin games: A randomized proof system, and a hierarchy of complexity classes." Journal of Computer and System Sciences, Volume 36, Issue 2, April (1988) 254-276.

[49] Paterson, K. G. "ID-based signatures from pairings on elliptic curves." IEEE Electronic Letters, (2002) 38(18): 1025-1026.

[50] Hess, F. "Efficient Identity Based Signature Schemes Based on Pairings." Revised Papers from the 9th Annual International Workshop on Selected Areas in Cryptography SAC'02, (2003) 310-324.

[51] Cha, J. C. and Cheon, J. H. "An identity based signature from Gap Diffie-Hellman groups." (LNCS 2567), (2003) 18-30.

[52] Yi, X. "An identity based signature scheme from the Weil pairing." IEEE Communications Letters, (2003) 7(2): 76-78.

[53] Boneh, D., Mironov, I. and Shoup, V. "A secure signature scheme from bilinear maps." In Proceeding of the Topics in Cryptology CT-RSA 2003, (LNCS 2612), (2003), 98-110.

[54] Zhang, F., Safavi-Naini, R. and Susilo, W. "An efficient signature scheme from bilinear pairing and its applications." Public Key Cryptography, (LNCS 2947), (2004) 277-290.

[55] Boneh, D. and Boyen, X. "Short Signatures Without Random Oracles." EUROCRYPT 2004, (LNCS 3027), (2004) 56-73.

[56] Shim, K. A. "An ID-based Aggregate Signature Scheme with Constant Pairing Computations." The Journal of Systems and Software, Vol. 83, (2010) 1873-1880.

[57] Hafizul Islam, SK and Biswas, G.P. "An efficient and provably-secure digital signature scheme based on elliptic curve bilinear pairings." Theoretical and Applied Informatics, Vol. 24, no. 2, (2012) 109-118.

[58] Mishra, S., Yaduvanshi, R., Rai, A. K. and Singh, N. P. "An ID-Based Signature Scheme from Bilinear Pairing Based on Ex-K-Plus Problem." Trans Tech Publications, Vols. 403-408, (2012) 929-934.

[59] Gopal, P. V. S. S. N. and Vasudeva Reddy, P. "Efficient ID-Based Signature Scheme using Pairings." Int. J. of Network Security, Vol. 6, (April 2014) 78-85.

[60] Huang, Z., Chen, K. and Wang, Y. "Efficient identity-based signature and blind signatures." (LNCS 3810), (2005) 120-133

[61] Paterson, K. G. and Schuldt, J. C. N. "Efficient identity based signature secure in the standard model." (LNCS 4058), (2006) 207-222.

[62] Rodriguez-Henriquez, F., Diaz-Perez, A., Saqib, N. A. and Ko,c, C,. K. Cryptographic Algorithms on Reconfigurable Hardware, ser. Signals and Communication Technology. Boston, Mass.: Springer US, 2006.

[63] Beuchat, J.-L., Brisebarre, N., Detrey, J., Okamoto, E., Shirase, M. and Takagi, T. "Algorithms and Arithmetic Operators for Computing the ηT Pairing in Characteristic Three." IEEE Transactions on Computers, vol. 57, no. 11, (November 2008) 1454-1468.

[64] Beuchat, J.-L., Brisebarre, N., Detrey, J., Okamoto, E. and Rodriguez-Henriquez, F. "A Comparison Between Hardware Accelerators for the Modified Tate Pairing over F2m and F3m." Pairing-Based Cryptography Pairing 2008, (2008) 297-315.

[65] Kammler, D., Zhang, D., Schwabe, P., Scharwaechter, H., Langenberg, M., Auras, D., Ascheid, G. and Mathar, R. "Designing an ASIP for Cryptographic Pairings over Barreto-Naehrig Curves." Cryptographic Hardware and Embedded Systems CHES 2009 Springer Berlin/Heidelberg, (2009), 254-271.

[66] Ghosh, S., Mukhopadhyay, D. and Roychowdhury, D. "High Speed Flexible Pairing Cryptoprocessor on FPGA Platform." Pairing-Based Cryptography Pairing 2010, vol. 6487, (2010) 450-466.

[67] Estibals, N. "Compact Hardware for Computing the Tate Pairing over 128-Bit Security Supersingular Curves." Pairing-Based Cryptography Pairing 2010, vol. 6487, (2010) 397-416.

[68] Ghosh, S., Roychowdhury, D. and Das, A. "High Speed Cryptoprocessor for ηT Pairing on 128-bit Secure Supersingular Elliptic Curves over Characteristic Two Fields." Cryptographic Hardware and Embedded Systems CHES 2011, (2011) 442-458.

[69] Beuchat, J.-L., Detrey, J., Estibals, N., Okamoto, E. and Rodriguez-Henriquez, F. "Fast Architectures for the ηT Pairing over Small-Characteristic Supersingular Elliptic Curves." IEEE Transactions on Computers, vol. 60, no. 2, (February 2011) 266-281.

[70] Cheung, R. C. C., Duquesne, S., Fan, J., Guillermin, N., Verbauwhede, I. and Yao, G. X. "FPGA Implementation of Pairings Using Residue Number System and Lazy Reduction." Cryptographic Hardware and Embedded Systems CHES 2011, no. 07, (2011) 421-441.

[71] Adikari, J., Hasan, M. A. and Negre, C. "Towards Faster and Greener Cryptoprocessor for Eta Pairing on Supersingular Elliptic Curve over F21223" 19th International Conference, Selected Areas in Cryptography 2012, (2012) 166-183.

[72] Menezes, A., van Oorschot, P. and Vanstone, S. Handbook of Applied Cryptography, CRC Press, 1996.

[73] R. Schoof: Elliptic Curves over Finite Fields and the Computation of Square Roots mod p. Math. Comp., 44(170):483-494, 1985 (available at http://www.mat.uniroma2.it/~schoof/ctpts.pdf).

The invention claimed is:

1. A method of anonymously identifying a user as a member of a group of users, the method being performed in a computing system comprising at least one computing device of a trusted party and a plurality of computing devices of users, wherein the method comprises:
(1) a preliminary stage (300) including steps performed in the computing device of the trusted party, the steps comprising:
(1a): for each j-th user from n users of the group, $1 \leq j \leq n$, computing (320) a unique private identifier $x_j$ for the j-th user, wherein $x_j$ does not enable to restore therefrom any personal information of the j-th user, and wherein each of the computed private identifiers has the same number of digits λ;
(1b): for each i-th user from n users of the group, $1 \leq i \leq n$,
computing (330) a personal secret for the i-th user as $P_i = [\beta \hat{\Gamma}_i \pmod{m}]G_1$, where $\hat{\Gamma}_i = x_i^{-1}\Gamma \pmod{m}$, $\Gamma = \Pi_{i=1}^{n} x_i \pmod{m}$, β is a common secret available only to the trusted party, $G_1$ is a generator of a subgroup $G^1$ of a prime order m of an additive group of points $E(\mathbb{F}_p)$ on an elliptic curve $E/\mathbb{F}_p$ over a finite field $\mathbb{F}_p$, p<3 is an odd prime, [·] denotes scalar product; and
sending (340), to a computing device of the i-th user, the private identifier $x_i$ of the i-th user and the personal secret $P_i$ of the i-th user; and
(1c): computing (350) a public group key for the group as $\tilde{g} = e_m(\beta \Gamma \pmod{m}]G_1, G_1)$ where $e_m(·,·)$ is symmetric pairing which represents mapping $G_1 \times G_1 \mapsto G_3$, wherein $G_3$ is a subgroup of the prime order m in of a multiplicative group of an extended finite field $\mathbb{F}_{p^k}^*$ with a generator g with an embedding degree k<1,
wherein P, m, $G_1$, $G_3$, $e_m(·,·)$ are preset in the computing device of the trusted party and are publicly known, β is preset in the computing device of the trusted party, wherein $\beta \in_R (0, m-1]$, $2^{\lambda-} < m < 2^\lambda$, where n<m; and
(2) an identification session (400) including steps comprising:
(2a): in a computing device of a user to be identified, computing (403) a witness as P1=[v]P, where P is a personal secret of the user to be identified, v is a first random number selected (401) in the computing device of the user to be identified, the first random number being usable only once for each identification session, $v \in_R (0, m-1]$, and sending (404), from the computing device of the user to be identified to the computing device of a verifying party, a first message containing the computed witness;

(2b): in the computing device of the verifying party, computing (406) a query as $P2=[\phi]G_1$, where $\phi$ is a second random number selected (405) in the computing device of the verifying party, the second random number being usable only once for each identification session, $\phi \in_R (0, m-1]$, and sending (407), from the computing device of the verifying party to the computing device of the user to be identified, a second message containing the computed query;

(2c): in the computing device of the user to be identified, computing (409) a response as $g_1=e_m([v+z \pmod{m}]P, P2)$, where z is a private identifier of the user to be identified, and sending (410), from the computing device of the user to be identified to the computing device of the verifying party, a third message containing the computed response, (2d): in the computing device of the verifying party, verifying (412) the response $g_1$ for equality to a verification factor computed as $\tilde{g}^\phi g_2$, where $g_2=e_m(P1, P2)$, and identifying the user to be identified as a member of the group only if the response is equal to the computed verification factor.

2. The method according to claim 1, wherein
step (1a) of the preliminary stage (300) further comprises, prior to the computing (320): for each j-th user from n users of the group, $1 \leq j \leq n$, assigning (310) to the -th user a registration identifier $a_j$, where $a_i$ is a sequence of symbols; and
the unique private identifier $x_j$ for the j-th user is computed (320) based on $a_j$, without possibility to restore $a_j$ from $x_j$.

3. The method according to claim 2, wherein the private identifier $x_i$ for the i-th user, $1 \leq i \leq n$, is computed as $x_i = h(a_i \| h^i(\beta))$ where $h(\cdot)$ is a $\lambda$-bit first cryptographic hash function, $h^i(\cdot)$ denotes i-time iterative application of $h(\cdot)$, $\cdot \| \cdot$ denotes concatenation.

4. The method according to claim 1, wherein, prior to computing the witness, step (2a) of the identification session (2) comprises: verifying (402) whether a condition $([v]P \neq \infty) \wedge ([v+z \pmod m]P \neq \infty)$ is met with respect to the selected v, and, if said condition is not met, selecting a new v.

5. The method according to claim 1, wherein, prior to computing the response $g_1$, step (2c) of the identification session (2) comprises: verifying (408) that $P2 \neq \infty$, wherein if $P2=\infty$, the identification session (2) is terminated.

6. The method according to claim 1, wherein
computing the public group key for the group includes steps comprising:
creating (351) a public group key certificate including information about the trusted party, the public group key, and a digital signature (DS) of the public group key certificate;
placing (352) the public group key certificate into a public data storage;
prior to verifying the response for equality to the verification factor, the method further includes steps performed in the computing device of the verifying party, said steps comprising: reading (411) the public group key certificate from the public data storage, and verifying the DS of said certificate, wherein said verification of the response $g_1$ is performed only if the DS of the public group key certificate is successfully verified.

7. The method according to claim 6, wherein
the DS of the public group key certificate is computed as
$\Im \Leftarrow \text{sign}(\mathcal{H}(\tilde{g} \| \mathcal{D}_T), \mathcal{S})$ where $\text{Sign}(\cdot, \cdot)$ is a function of generating the DS, $\mathcal{S}$ is a secret key of the trusted party, $\mathcal{D}_T$ is the information about the trusted party, $\mathcal{H}(\cdot)$ is a second cryptographic hash function;
the DS of the public group key certificate is verified with
$\mathcal{B} \Leftarrow \text{Verify}(\mathcal{H}(\tilde{g} \| \mathcal{D}_T), \Im, \mathcal{P})$, where $\text{Verify}(\cdot, \cdot, \cdot)$ is a function of verifying the DS, wherein a value of $\mathcal{B}$ is True if the DS is valid, and False otherwise, $\mathcal{P}$ is a public key of the trusted party, said public key being paired to $\mathcal{S}$, wherein said verification of the response $g_1$ is performed if ($\mathcal{B}$=True) $\wedge$ (P1$\neq \infty$).

8. The method according to claim 1, wherein, when at least one new user is added to the group, step (1a) of the preliminary stage (1) is further performed with respect to said at least one new user, and steps (1b) to (1c) of the preliminary stage (1) are newly performed with respect to the entire group of users whereto the at least one new user has been added.

9. The method according to claim 1, wherein, upon each exclusion of at least one user from the group of users, the preliminary stage (1) further comprises a step performed in the computing device of the trusted party, said step comprising: selecting a new common secret $\beta'$ such that $\beta'$ is not equal to a previously used common secret, wherein steps (1b) to (1c) of the preliminary stage (1) are newly performed with respect to the entire group of users from which said at least one user has been excluded.

10. A computing system (200) configured for anonymously identifying a user as a member of a group of users, the computing system comprising, at least, a computing device (201) of a trusted party and a plurality of computing devices (202) of users,
the computing device of the trusted party and the computing devices of the users each comprising, at least:
one or more processors;
communication means; and
one or more data storage devices having computer-executable instructions stored therein for execution by the one or more processors,
wherein the computing device (201) of the trusted party, when executing the instructions by the one or more processors of the computing device of the trusted party, is configured to perform a preliminary stage (1) comprising the following operations:
(1a): for each j-th user from n users of the group, $1 \leq j \leq n$, for each j-th user from n users of the group, $1 \leq j \leq n$, computing a unique private identifier $x_j$ for the j-th user, wherein $x_j$ does not enable to restore therefrom any personal information of the j-th user, and wherein each of the computed private identifiers has the same number of digits $\lambda$;
(1b): for each i-th user from n users of the group, $1 \leq i \leq n$,
computing a personal secret for the i-th user as $P_i=[\beta \hat{\Gamma}_i \pmod m]G_1$, where $\hat{\Gamma}_i = x_i^{-1} \Gamma \pmod m$, $\Gamma = \Pi_{i=1}^n x_i \pmod m$, $\beta$ is a common secret available only to the trusted party, $G_1$ is a generator of a subgroup $G_1$ of a prime order m of an additive group of points $E(\mathbb{F})$ on an elliptic curve $E/\mathbb{F}_p$ over a finite field $\mathbb{F}_p$, p>3 is an odd prime, $[\cdot]$ denotes scalar product; and sending, to a computing device of the i-th user, the private identifier $x_i$ of the i-th user and the personal secret $P_i$ of the i-th user; and (1c): computing a public group key for the group as $\tilde{g}=e_m([\beta\Gamma(\bmod\ m)]G_1, G_1)$ where $e_m(\cdot,\cdot)$ is symmetric pairing which represents mapping $G_1 \times G_1 \mapsto G_3$ wherein $\underline{?}_3$ is a subgroup of the prime order m of a multiplicative group of an extended finite field $\mathbb{F}_{p^k}^*$ with a generator g with an embedding degree k>1, wherein P, m, $G_1$, $G_3$, $e_m(\cdot,\cdot)$ are preset in the computing device of the trusted party and are publicly known, $\beta$ is preset in the computing device of the trusted party, wherein $\beta \in_R (0, m-1]$, $2^{\lambda-1} < m < 2^\lambda$, where n<m; and wherein a computing device (202-N) of a verifying party, when executing the instructions by the one or more processors of the computing device of the verifying party, and a computing device (202-1) of a user to be identified, when executing the instructions by the one or more processors of the computing device of the user to be identified, are configured to perform an identification session (2) comprising the following operations:

(2a): in the computing device (202-1) of the user to be identified, computing a witness as P1=[v]P, where P is a personal secret of the user to be identified, v is a first random number selected in the computing device (202-1) of the user to be identified, the first random number being usable only once for each identification session, $v \in_R (0, m-1]$, and sending, from the computing device (202-1) of the user to be identified to the computing device (202-N) of the verifying party, a first message containing the computed witness;

(2b): in the computing device (202-N) of the verifying party, computing a query as P2=[φ]$G_1$, where φ is a second random number selected in the computing device (202-N) of the verifying party, the second random number being usable only once for each identification session, $\phi \in_R (0, m-1]$, and sending, from the computing device (202-N) of the verifying party to the computing device (202-1) of the user to be identified, a second message containing the computed query;

(2c): in the computing device (202-1) of the user to be identified, computing a response as $g_1=e_m([v+z(\bmod\ m)]P, P2)$, where z is a private identifier of the user to be identified, and sending, from the computing device (202-1) of the user to be identified to the computing device (202-N) of the verifying party, a third message containing the computed response, (2d): in the computing device (202-N) of the verifying party, verifying the response $g_1$ for equality to a verification factor computed as $\tilde{g}^\phi g_2$, where $g_2=e_m(P1, P2)$ and identifying the user to be identified as a member of the group only if the response is equal to the computed verification factor.

11. The computing system according to claim 10, wherein operation (1a) of the preliminary stage (1) further comprises, prior to the computing: for each j-th user from n users of the group, 1≤j≤n, assigning to the j-th user a registration identifier $a_j$, where $a_j$ is a sequence of symbols; and the unique private identifier $x_j$ for the j-th user is computed based on $a_j$, without possibility to restore $a_j$ from $x_j$.

12. The computing system according to claim 11, wherein the private identifier $x_i$ for the i-th user, 1≤i≤n, is computed as $x_i=h(a_i\|h^i(\beta))$, where $h(\cdot)$ is a λ-bit first cryptographic hash function, $h^i(\cdot)$ denotes i-time iterative application of $h(\cdot)$, $\cdot\|\cdot$ denotes concatenation.

13. The computing system according to claim 10, wherein, prior to computing the witness, operations (2a) of the identification session (2) comprise: verifying whether a condition $([v]P \neq \infty) \wedge ([v+z(\bmod\ m)]P \neq \infty)$ is met with respect to the selected v, and, if said condition is not met, selecting a new v.

14. The computing system according to claim 10, wherein, prior to computing the response $g_1$, operation (2c) of the identification session (2) comprises: verifying that P2≠∞, wherein if P2=∞, the identification session (2) is terminated.

15. The computing system according to claim 10, wherein computing the public group key for the group further comprises:

creating a public group key certificate including information about the trusted party, the public group key, and a digital signature (DS) of the public group key certificate;

placing the public group key certificate into a public data storage;

prior to verifying the response $g_1$ for equality to the verification index, the following operations are further performed in the computing device of the verifying party:

reading the public group key certificate from the public data storage, and verifying the DS of said certificate, wherein said verification of the response $g_1$ is performed only if the DS of the public group key certificate is successfully verified.

16. The computing system according to claim 15, wherein the DS of the public group key certificate is computed as $\mathfrak{I} \Leftarrow \mathrm{Sign}(\mathcal{H}(\tilde{g}\|\mathcal{D}_T), \mathcal{S})$, where $\mathrm{Sign}(\cdot,\cdot)$ is a function of generating the DS, $\mathcal{S}$ is a secret key of the trusted party, $\mathcal{D}_T$ is the information about the trusted party, $\mathcal{H}(\cdot)$ is a second cryptographic hash function; the DS of the public group key certificate is verified with $\mathfrak{B} \Leftarrow \mathrm{Verify}(\mathcal{H}(\tilde{g}\|\mathcal{D}_T), \mathfrak{I}, \mathcal{P})$, where $\mathrm{Verify}(\cdot,\cdot,\cdot)$ is a function of verifying the DS, wherein a value of $\mathfrak{B}$ is True if the DS is valid, and False otherwise, $\mathcal{P}$ is a public key of the trusted party, said public key being paired to $\mathcal{S}$, wherein said verification of the response $g_1$ is performed if $(\mathfrak{B}=\mathrm{True}) \wedge (P1 \neq \infty)$.

17. The computing system according to any of claims 10 to 12 claim 10, wherein, when at least one new user is added to the group, operation (1a) of the preliminary stage (1) is further performed with respect to said at least one new user, and operations (1b) to (1c) of the preliminary stage (1) are newly performed with respect to the entire group of users whereto the at least one new user has been added.

18. The computing system according to claim 10, wherein, upon each exclusion of at least one user from the group of users, the preliminary stage (1) further comprises an operation performed in the computing device of the trusted party, said operation comprising: selecting a new common secret β' such that β' is not equal to a previously used common secret, wherein operations (1b) to (1c) of the preliminary stage (1) are newly performed with respect to the entire group of users from which said at least one user has been excluded.

* * * * *